(12) United States Patent
Fink et al.

(10) Patent No.: US 6,433,931 B1
(45) Date of Patent: Aug. 13, 2002

(54) POLYMERIC PHOTONIC BAND GAP MATERIALS

(75) Inventors: Yoel Fink, Cambridge; Edwin L. Thomas, Natick, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/367,332

(22) PCT Filed: Feb. 11, 1998

(86) PCT No.: PCT/US98/02974

§ 371 (c)(1),
(2), (4) Date: Jan. 10, 2000

(87) PCT Pub. No.: WO98/35248

PCT Pub. Date: Aug. 13, 1998

Related U.S. Application Data

(60) Provisional application No. 60/037,902, filed on Feb. 11, 1997.

(51) Int. Cl.$^7$ .................................................. G02B 1/10
(52) U.S. Cl. ........................ 359/586; 359/589; 359/241
(58) Field of Search ................................ 359/248, 252, 359/298–300, 321, 586, 589, 652–655, 241–244

(56) References Cited

U.S. PATENT DOCUMENTS

| | | | |
|---|---|---|---|
| 3,928,490 A | 12/1975 | Hergenrother | 525/105 |
| 4,233,427 A | 11/1980 | Bargain et al. | 525/478 |
| 4,529,629 A | 7/1985 | Liu | 427/387 |
| 4,585,670 A | 4/1986 | Liu | 427/515 |
| 4,618,644 A | 10/1986 | Lui | 524/535 |
| 4,761,464 A | 8/1988 | Zeigler | 528/30 |
| 5,281,370 A | 1/1994 | Asher et al. | 264/1.1 |
| 5,296,571 A | 3/1994 | Hoxmeier | 528/25 |
| 5,335,240 A | 8/1994 | Ho et al. | 372/39 |

(List continued on next page.)

FOREIGN PATENT DOCUMENTS

| | | |
|---|---|---|
| EP | WO-96/27225 A1 * | 9/1996 |
| EP | WO-96/29621 A1 * | 9/1996 |
| EP | WO-97/01440 A1 * | 1/1997 |
| WO | WO 00/02090 | 1/2000 |

OTHER PUBLICATIONS

Albalak et al, "Microphase Separation of Block Copolymer Solutions in a Flow Field," Journal of Polymer Science:Part B:Polymer Physics, vol. 31, pp. 37–46 (1993).*
M.A. Hartney and A.E. Novembre, "Poly (methylstrene–Dimethylsiloxane) block copolymers as bilevel resists,"SPIE, vol. 539, pp. 90–96, 1985.

(List continued on next page.)

*Primary Examiner*—Evelyn A. Lester
(74) *Attorney, Agent, or Firm*—Wolf, Greenfield & Sacks, P.C.

(57) ABSTRACT

A polymeric photonic band gap structure can be defined by a block copolymeric species, a mixture of homopolymers, or a combination optionally with appropriate dielectric contrast enhancing additives. The structure includes periodic, phase-separated microdomains alternating in refractive index, the domains sized to provide a photonic band gap in the UV-visible spectrum. A method of the invention involves creating a defect in a polymeric article including a periodic structure of a plurality occuring separate domains. The defect can be created by inserting into the material a plane of a material different from materials defining the polymeric article. According to another method of the invention, a defect is created in a polymeric article, including a periodic structure of a plurality of periodically occuring separate domains, by altering polymeric material in the article. The polymeric material can be altered by removing polymeric material via radiation, by exposing the material to intersecting beams of radiation, by removing the material via etching or the like. A defect can be created in one embodiment by magnetically guiding a defined by a block copolymeric species, a mixture of homopolymers, or a combination optionally with appropriate dielectric contrast enhancing additives.

105 Claims, 5 Drawing Sheets

U.S. PATENT DOCUMENTS

| | | | | |
|---|---|---|---|---|
| 5,337,185 A | * | 8/1994 | Meier et al. | 359/321 |
| 5,385,114 A | * | 1/1995 | Milstein et al. | 117/1 |
| 5,385,117 A | | 1/1995 | Milstein et al. | 117/1 |
| 5,389,943 A | * | 2/1995 | Brommer et al. | 343/909 |
| 5,406,573 A | | 4/1995 | Ozbay et al. | 372/43 |
| 5,440,421 A | | 8/1995 | Fan et al. | 359/245 |
| 5,448,514 A | | 9/1995 | Cho et al. | 365/126 |
| 5,471,180 A | * | 11/1995 | Brommer et al. | 333/202 |
| 5,526,449 A | | 6/1996 | Meade et al. | 385/14 |
| 5,594,070 A | | 1/1997 | Jacoby et al. | 525/88 |
| 5,600,483 A | * | 2/1997 | Fan et al. | 359/344 |
| 5,622,668 A | | 4/1997 | Thomas et al. | 264/289.3 |
| 5,651,818 A | * | 7/1997 | Milstein et al. | 117/54 |
| 5,661,092 A | | 8/1997 | Koberstein et al. | 427/515 |
| 5,688,318 A | * | 11/1997 | Milstein et al. | 117/1 |
| 6,049,419 A | * | 4/2000 | Wheatley et al. | 359/359 |

OTHER PUBLICATIONS

V. Sankaran et al., "Synthesis of zinc sulfide clusters and zinc particles within microphase–seperated domains of organometallic block polymers" Chem. Mater. 1993, vol. 5, pp. 1133–42.

J.T. Chen et al., "Theoretical prediction of the optical waveguiding properties of self–assembled block coolymer films", Macromolecules, 1995, vol. 28, pp. 5811–18.

J.T. Chen et al., "Self–assembled smectic phases in rod–coil block copolymers", Science, Jul. 1996, vol. 273, pp. 343–46.

J. Joannopoulos et al., "Photonic Crystals: molding the flow of light", Princeton University Press, 1995, pp. 1–132.

S.Fan et al., "Design of three–dimensional photonic crystals at submicron lengthscales", Appl. Phus. Lett., vol. 65, No. 11, Sep. 1994, pp. 1106–08.

L. Zimmermann et al., "High refractive index films of polymer thin films", Appl. Phys,. Lett. vol. 8, No. 7, Jul. 1993, pp. 1742–48.

P. Mansky et al., "Nanolithographic templates from diblock copolymer thin films", Appl. Phys. Lett. vol 68, No. 18, 1996, pp. 2586–88.

B.H. Sohn et al., "Processible optically transparent block copolymer films containing superparamagnetic iron oxide nanoclusters", chem. Mater., vol. 9, No. 1, 1997, pp. 264–69.

T. Hashimoto, et al., "Nanoprocessing based on bicontinuous microdomains of block copolymers nonchannels coated with metals", Langmuir, vol. 13, 1997, pp. 6869–72.

P. Mansky et al., "Monolayer films of diblock copolymer microdomains for nanolithographic applications", J. Mater. Sci., vol. 30, 1995, pp. 1987–92.

J. Lee et al., "Polymerization of monomers containing functional silyl groups. 5. Synthesis of new porous membranes with functional groups", Macromolecules, vol. 21, NO. 1, 1988, pp. 274–78.

K.H. Pannell et al., "Ferrocenyl containing polysilanes," Macromolecules, vol. 21, No. 1, 1988, PP. 276–278.

J. Lee et al., "Polymerization of monomers containing functional silyl groups. 7. Porous membranes with controlled microstructures", Macromolecules, Vol. 22, No. 6, 1989, pp. 2602–06.

M. Templin et al., "Organically mofified aluminosilicate mesostructures from block copolymer phases", Science, vol. 278, 1997, pp. 1795–98.

M. van dijk et al., "Ordering phenomena in thin block copolymer fluid studied using atomic force microscopy", Macromolicules, 1995, vol. 28, pp. 6773–78.

A. Gabor et al., "Synthesis and lithographic characterization of block copolymer resists consisting of both poly(styrene) blocks and hydrosiloxane–modified poly(diene) blocks", Chem. Mater. 1994, vol. 6, pp. 927–34.

J. Chu et al., "Morphologies of strongly segregated polystyrene–poly(dimethylsiloxane) diblock copolymers", Polymer vol. 36, No. 8, 1995, pp. 1569–75.

G.liu et al.,"Potential skin layers for membranes with tunable nanochannels", Macromolecules, 1997, vol. 30, pp. 1851–53.

M. Park et al., "Block copolymer lithography: periodic arrays of ~$10^{11}$holes in 1 square centimeeter", Sci., vol. 276, 1997, pp. 1401–04.

A.H. gabor & C. K. Ober, "Silicon–containing block copolymer resist materials", Microelectronics technology:.

H. Ito et al., "Silicon–containing block copolymer membranes", Polymer, vol. 37, No. 4, 1996, pp. 633–37.

E. Huang et al., "Using surface active random copolymers to control the domain orientation in diblock copolymer thin films, "Macromolecules, vol. 31, No. 22, pp. 7641–7650, 1998.

A. Hirao et al., "Polymerization of monomers containing functional silyl groups. 12. Anionic polymerization of styrene derivatives para–substituted withpentamethyldisilyl (Si–Si), heptamthyltrisilyl )Si–Si), and popamethyltetrasilyl (Si–Si–Si–Si) groups," Macromol. Symp., vol. 95, pp. 293–302, 1995.

D.S. Herman et al., "A compositional study of the morphology of 18–armed poly(styrene–isoprene) star block copolymers," Macromolecules, vol. 20, No. 11, pp. 2940–2942, 1987.

A. Avgeropoulos et al., "Tricontinous double gryoid cubic phase in triblock copolymers of the ABA tyoe", Macromolecules, vol. 30, no. 19, pp. 534–5642, 1997.

G. Kim and M. Libera, "Morphological development in solvent–cast polystyrene–polystyrene (SBS) triblock copolymer thin films", Macromolicules, vol. 31, No. 8, pp. 2569–2577, 1998.

P. Mansky et al., "Large–area domain alignment in block copolymer thin films using electric fields", Macromolecules, vol. 31, No. 13, pp. 4399–4401, 1998.

E. Helfand & Z.R. Wasseman, "Microdomain structure and the interface in block copolymers", Developments in Block Copolmers, I. Goodman editor, Applied Science Publishers, London 1982, vol. 1, Chap. 4, pp. 99–126.

E. Huang et al., "Nanodomain control in copolymer thin films", vol. 395, pp. 757–758, Oct. 1998.

E.L. Thomas & R.L. Lescanec, "Phase morhology in block copolymer systems", Phil. Trans. R. Soc. Lond. A, vol. 348, pp. 149–166, 1994.

R.J. Albalak & E.L. Thomas, "Microphase separation of block copolymer solutions in a flow field", J. Polym. Sci.: Part B: Polymer Physics, vol. 31, pp. 37–46, 1993.

U. S. Patent Application Ser. No. 09/720,710, filed Dec. 29, 2000, by V. Chen et al.

* cited by examiner

POLYMERIC PHOTONIC BAND GAP MATERIALS

RELATED APPLICATIONS

This application is a National Stage filing under 35 U.S.C. §371 of International Application Ser. No. PCT/US98/02974, filed Feb. 11, 1998, which was published under PCT Article 21(2) in English. This application claims the benefit under 35 U.S.C. §119(e) of U.S. Provisional Application Ser. No. 60/037,902, filed Feb. 11, 1997.

FIELD OF THE INVENTION

The present invention relates generally to polymeric materials that display periodic ordering, and more particularly to a polymeric article defining an optical band gap material.

BACKGROUND OF THE INVENTION

Photonic band gap materials, that is, materials that can control the propagation of electromagnetic radiation by creating periodic dielectric structures, have been the subject of vigorous research in recent years. A photonic band gap material is one that prohibits the propagation of electromagnetic radiation within a specified frequency range (band) in certain directions. That is, band gap materials prevent light from propagating in certain directions with specified energies. This phenomenon can be thought of as the complete reflection of electromagnetic radiation of a particular frequency directed at the material in at least one direction because of the particular structural arrangement of separate domains of the material, and refractive indices of those domains. The structural arrangement and refractive indices of separate domains that make up these materials form photonic band gaps that inhibit the propagation of light centered around a particular frequency. (Joannopoulos, et al., "Photonic Crystals, Molding the Flow of Light", Princeton University Press, Princeton, N.J., 1995). One-dimensional photonic band gap materials include structural and refractive periodicity in one direction, two-dimensional photonic band gap materials include periodicity in two directions, and three-dimensional photonic band gap materials include periodicity in three directions.

Ho, et al., "Existence of Photonic Gaps in Periodic Dielectric Structures", Phys. Rev. Lett., 65, 3152 (1990) correctly predicted that a properly-arranged, three-dimensional photonic band gap material would include a complete band gap, that is, that the material would reflect light of any polarization incident at any angle at a particular frequency. If one or more defects are created in such a material, the material can serve a variety of useful purposes. Point defects could define low loss optical resonance cavities, planar defects could define narrow-band filters, and pathways within three-dimensional photonic band gap materials could define lossless waveguides capable of guiding light around sharp corners, crucial to the creation of proposed optical computers. Totally-reflective UV or laser shields, and countless other commercial applications-would benefit from relatively simple and reliable techniques for forming these materials.

Fan, et al., ("Design of Three-Dimensional Photonic Crystals at Submicron Lengthscales", Appl. Phys. Lett., 65, 11, 09/12/94) describe a class of periodic, three-dimensional dielectric photonic crystal structures amenable to submicron-scale fabrication. Fabrication involves creating a layered structure of materials alternating in dielectric constant, and etching (drilling) holes through the article normal to the layered structure. Specifically, the layered structure is created by depositing a layer of silicon on a substrate, etching grooves into the resulting silicon layer, and filling the grooves with silicon dioxide. Another layer of silicon is deposited on the first layer, grooves offset from those of the first set of grooves are etched, and those grooves filled with silicon dioxide. The process is repeated to create the multi-layered structure, through which the holes are etched. Assuming dielectric constants of 12.096 for silicon and 2.084 for silicon dioxide, (both at wavelength=1.53 microns), the band gap was computed to extend from wavelength=1.43 microns to 1.64 microns.

Joannopoulos, et al. (referenced above) provides an overview of photonic band gap materials, and their theoretical treatment. Experimental results are reported, including construction of a two-dimensional crystal lattice that reflects essentially all in-plane light within a specified frequency band. Specifically, construction involved etching a triangular lattice of air columns in a crystal via electron-beam lithography (see Wendt, et al., "Nanofabrication of Photonic Lattice Structures in GaAs/AlGaAs", J. Vac. Sci. & Tech. B. 11, 2637 (1993)). The columns of air were fabricated having a radius of 122.5 nm, the lattice constant was 295 nm, and the columns were about 600 nm tall.

International Patent Application WO 97/01440 to 3M, entitled "Multilayer Polymer Film with Additional Coatings or Layers" ('440) describes a multilayer polymeric film including a plurality of alternating polymer layers that may act as a mirror or polarizer. The multilayer polymer films described in '440 include alternating layers of at least two materials where at least one of the materials has the property of stress induced birefringence, such that the index of refraction of the material is affected by mechanical stretching. By stretching the multilayer stack either uniaxially or biaxially, an optical film may be created with a range of reflectivities for differently oriented plain-polarized incident light. Desired refractive index contrast can be obtained by stretching the polymer films during or after film formation.

Chen, et al., "Theoretical Prediction of the Optical Waveguiding Properties of Self-Assembled Block Copolymer Films", Macromolecules, 17, (1995) describe a lamellar-forming block copolymeric waveguide, and computer calculations of propagation constants and optical field intensity distributions of selected diblock and triblock copolymeric thin-film waveguides. It is reported that by choosing the chemical composition of each block, the refractive index of each layer can be precisely controlled. Where the refractive index of a guiding layer is greater than the refractive indices of the substrate and superstrate layers, a waveguide can result. Chen, et al. report that the domain size of individual lamellae can be varied from tens of angstroms to thousands of angstroms.

U.S. Pat. No. 5,281,370 ('370) to Asher et al. entitled "Method of Making Solid Crystalline Narrow Band Radiation Filter" describes a method for making a solid polymeric optical filter material which filters a predetermined wavelength band from a broader spectrum of radiation. The method includes creating a colloidal suspension composed of polymeric particles dispersed within a medium, arranging the particles, for example by electrophoresis, to form an ordered array, and fixing the structure, for example by fusing the particles together, to yield a solid three-dimensional array having a periodic lattice spacing.

Three-dimensional periodicity in block-copolymeric, self-assembled structures are known. (Thomas, et al., "Phase Morphology in Block Copolymer Systems", *Phil. Trans. R. Soc. Lond A.*, 348, 149–166). Lamellar, cylindrical, spherical, and ordered bicontinuous double diamond morphologies in block copolymeric systems have been identified (see, for example, Helfand, et al., *Developments in Block Copolymers.* 1; Goodman, I., Ed.; Applied Science Publishers: London, 1982; vol. 1, pp. 99–126; Herman, et al., *Macromolecules*, 20, 2940–2942, (1987). Researchers have been successful in incorporation of metallic species, including clusters, selectively in a first but not a second domain of a two-domain species resulting from thermodynamic phase separation of block copolymeric species Sankaran, et al., "Synthesis of Zinc Sulfide Clusters and Zinc Particles Within Microphase-Separated Domains of Organometallic Block Copolymers", *Chem. Mater.*, 5, 1133–1142 (1993); Sohn, et al., "Processable Optically Transparent Block Copolymer Films Containing Superparamagnetic Iron Oxide Nanoclusters", *Chem. Mater.*, 9, 1, 264–269 (1997). Sankaran, et al. and Sohn, et al. pursued goals of creating monodisperse metal/semiconductor clusters in an organized array for the purpose of growing metal clusters in a controlled fashion for electrical, optical, magnetic, and catalytic applications. These and other techniques have shown some promise with respect to several diverse goals. However, there is a need in the art for inexpensive, simple, photonic band gap materials, and it is an object of the present invention to provide such materials.

SUMMARY OF THE INVENTION

The present invention provides a series of systems, polymeric materials, and methods associated with photonic band gap materials. The methods include methods of forming such materials and methods of use of such materials, and can be used in conjunction with any of the systems or polymeric materials of the invention. That is, all of the systems described below can be made using the methods of making materials described, and can be used in the methods of using photonic band gap materials. The methods of manufacture and use of photonic band gap materials described herein can be applied to all of the systems or polymeric materials described herein.

In one aspect, the invention provides a series of systems. One system includes a polymeric article having a periodic structure of a plurality of periodically occurring separate domains. The domains include at least a first and a second domain that each have a characteristic dimension from about 50 nm to about 1500 nm. The article has a refractive index ratio of at least about 1.1 for a continuous set of wavelengths lying within a range from about 100 nm to about 10 microns. That is, the article has a refractive index ratio of at least about 1.1 for at least one wavelength domain or continuous plurality of wavelengths, lying within a range of from about 100 nm to about 10 microns.

In another embodiment, a similar system is provided. In this embodiment, the first and the second domains each have a characteristic dimension from about 15 nm to about 50 nm and a refractive index ratio of at least about 1.2 for a continuous set of wavelengths lying within a range from about 50 nm to about 1000 nm.

In another embodiment, a similar system is provided that has a characteristic dimension of from about 300 nm to about 5000 nm and a refractive index ratio of greater than 1.0. The refractive index ratio is for a continuous set of wavelengths lying within a range from about 400 nm to about 50 microns.

In another embodiment, a system is provided that includes a structurally periodic polymeric structure including a defect in periodicity. The defect is at least partially transparent to electromagnetic radiation in a wavelength range of from about 100 nm to about 50 microns. A portion surrounds the defect which is reflective to the electromagnetic radiation.

In another emodiment, a system is provided that comprises a polymeric article including a three-dimensional periodic variation in refractive index.

In another aspect, the invention provides a series of methods. One method involves exposing a portion of a polymeric article in an ordered state, having a pathlength to electromagnetic radiation within a free space wavelength range of from about 50 nm to about 50 microns. The article is allowed to inhibit transmittance of the electromagnetic radiation to an extent greater than the article would inhibit that transmittance in a disordered state, at the frequency through the pathlength.

Another method of the invention involves creating a defect in a polymeric article including a periodic structure of a plurality occurring separate domains. The defect can be created by inserting into the material a plane of a material different from materials defining the polymeric article.

According to another method of the invention, a defect is created in a polymeric article, including a periodic structure of a plurality of periodically occurring separate domains, by altering polymeric material in the article. The polymeric material can be altered by removing polymeric material via radiation, by exposing the material to intersecting beams of radiation, by removing the material via etching or the like. A defect can be created in one embodiment by magnetically guiding a heated object through the article.

The systems or method of the invention can include at least one auxiliary refractive modifier in at least one of the first and the second domains. The refractive index modifier can be particulate material, a dye, a polymeric particulate material, a ceramic, semi-conductor, or other particulate material, or the like, and can provide a refractive index ratio in the article of greater than 1, or at least about 1.1, 1.2, 1.3, 1.4, 1.5, 2.0, or 4.0, in other embodiments.

The systems and methods of the invention can involve a polymeric article that has a one-dimensional structure, a two-dimentional periodic structure, or a three-dimensional periodic structure, and can be formed from polymeric materials that are self-assembled from self-assembly of polymeric materials to form separate domains followed by removal of one domain and replacement with a additive material such as a non-polymeric material. That is, first and second domains can be formed by polymeric self-assembly of the first domain and a polymeric precursor of the second domain, followed by replacement of the precursor by a non-polymeric material.

The systems and methods of the invention can involve a polymeric article that includes a block co-polymer having at least two Blocks A and B that are assembled into the first and second domains, respectively. The polymeric article can also include at least three blocks, A, B and C wherein the blocks A and B are self-assembled into the first and the second domains.

The systems and methods of the invention can include polymeric articles that include at least one defect in periodicity. The defect in periodicity can be a point, line, planer defect, or combination thereof, and the defect can have a width, length and height. Where the polymeric article is at least two-dimentionally periodic, the defect can be provided in at least one of the two dimensions, or in two dimensions. Where the polymeric article is three-dimensionally periodic, the defect can be provided in one, two or three dimensions.

The defect can be a series of interconnected points, or a line having a width and a length at least five times the width, and other geometric arrangements. A defect can be a continous pathway that is nonlinear, and can be three-dimensionally non-linear. The defect can be in the order of dielectric domains of the structure and can be a defect in refractive index between at least two adjacent domains of a polymeric article.

In some embodiments, the polymeric article of systems or methods of the invention can include a metallic species, rather than a refractive index-modifying species. The metallic species can be a refractive index-modifying species, or another metallic species residing primarily in one domain, selectively.

Systems or methods of the invention can include polymeric articles that are periodic arranged structures of a plurality of separate domains. The structure can inhibit transmittance of electromagnetic radiation at a free-space wavelength range from about 50 nm to about 50 microns relative to transmission of electromagnetic radiation at the wavelength through a system comprised of the same materials, but in a disarranged state. These structures can inhibit transmittance at a free-space wavelength range of from about 300 nm to about 50 microns in other embodiments. A periodic arranged structure can be provided in accordance with systems or methods of the invention that has a photonic band gap in at least one direction within a free-space wavelength range of from about 50 nm to about 50 microns. A periodic arranged structure can have a photonic band gap in at least one direction within a free-space wavelength range of from about 300 nm to about 50 microns.

Systems or methods of the invention can include polymeric articles that in a disarranged state, are at least partially transparent to light within a wavelength range of from about 100 nm to about 10 microns, or a wavelength range of from about 400 nm to about 50 microns.

The invention also provides systems that are block copolymers. One block copolymeric species has at least two blocks A and B. The blocks A and B are incompatible with each other such that the block copolymer species is self-assembleable into a periodic structure of a plurality of at least first and second, separate domains, each defined by association of similar blocks of the copolymer species. The periodic structure into which the block copolymer species is self-assembleable is able to contain at least one auxiliary index of refraction enhancing additives such that the first and second domains have a refractive index ratio of at least 1.1 at a wavelength of from about 100 nm to about 10 microns, or other refractive index ratios for a continuous set of wavelengths lying within ranges as described herein. In one embodiment, the molecular weight of the block copolymeric species is at least 80,000 Daltons. In another embodiment, the molecular weight is at least 500,000 Daltons, and in another embodiment, at least 2,000,000 Daltons.

Another method of the invention involves a method for processing a block co-polymer. In one embodiment, a block copolymer is processed to produce a phase-separated polymeric multi-domain structure. The structure includes a periodic variation in refractive index of a dimension on the order of from about 100 nm to about 50 microns, to the extent that the article defines a photonic band gap structure. The block co-polymer can be allowed to self-assemble into the phase-separated polymeric multi-domain structure and this can occur in the presence of an applied, electric, magnetic, or mechanical flow field in certain embodiments. In one preferred embodiment, the phase-separated structure is self-assembled in the presence of an applied electromagnetic field.

Systems of the invention can include a metallic coating on metallic particles that reside primarily in one domain selectively.

Other advantages, novel features, and objects of the invention will become apparent from the following detailed description of the invention when considered in conjunction with the accompanying drawings, which are schematic and which are not intended to be drawn to scale. In the figures, an identical or nearly identical component that is illustrated in various figures, is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
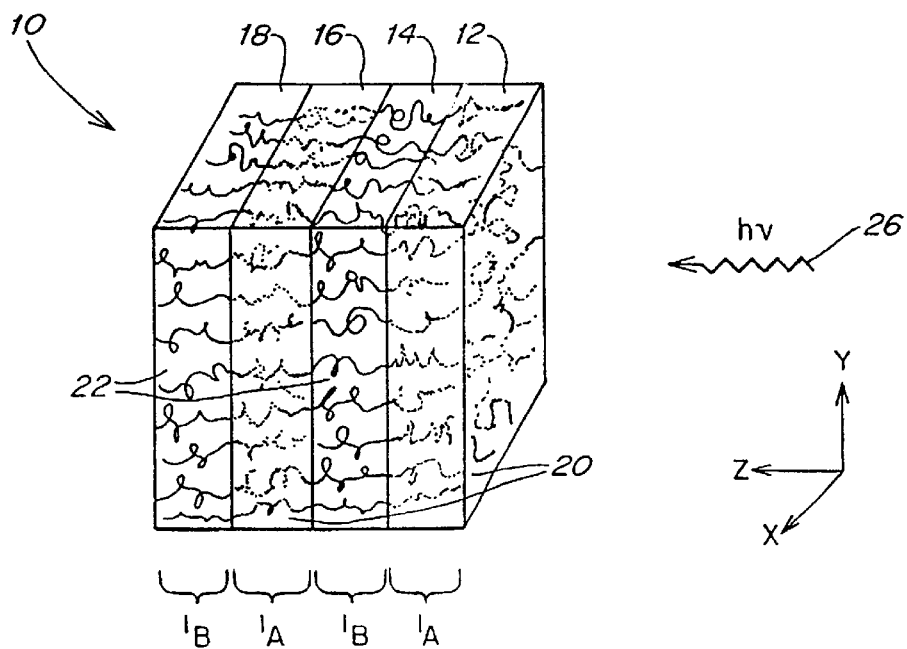
FIG. 1 is a schematic illustration of a polymeric one-dimensional photonic band gap material.

The invention provides a polymeric system arranged as a photonic band gap material that inhibits the propagation of a selected frequency of electromagnetic radiation in at least one direction. The term "polymeric system" or "polymeric article" as used herein includes any system or article constructed at least in part from at least one polymer material. The polymeric systems of the invention are inexpensive, allow large area coverage, are mechanically flexible, and, in certain embodiments, self-assemble. The invention provides one, two, and three-dimensional polymeric articles having periodic dielectric structures resulting in polymeric band gap articles that exhibit a band gap inside a specified frequency range in one dimension, two dimensions, or three dimensions. That is, the polymeric articles of the invention inhibit the propagation of electromagnetic radiation at wavelengths in the material ($\lambda_{freespace}/n_{effective}$) on the order of the periodicity length of the material in at least one direction, two directions, and a plurality of directions including omnidirectional. With the addition of one or more defects, the arrangement can be used to cause light to propagate along planes, along lines, through nonlinear and non-planar continuous pathways, through spaces, and into points. The periodicity of the polymeric systems of the invention and the size of the domains within the systems can be altered, for example by deforming the polymer. For example, periodicity can be altered by mechanical means, such as drilling holes in a system or cutting a system along a specific plane, thermal means, such as selective melting of portions of a system with hot probes or lasers, chemical means, such as selective etching or chemical modification of portions of a system, through selective manipulation of processing procedures, such as processing under the influence of an external field, roll casting, or additions of impurities into one or portions comprising a system, and via a variety of other means hereinafter described or apparent to one of ordinary skill in the art. The dielectric contrast, as well as the periodicity of the periodic dielectric structure, can be varied. In some embodiments, the structure need not be strictly periodic but may be modulated by a field gradient or other modulating means.

The band gap articles of the invention are not limited to use with visible light, although articles operating in the visible light spectrum are preferred. The photonic band gap articles of the invention that operate in the visible light range can be used for low loss waveguides capable of guiding light through non-linear, non-planar pathways that can include sharp corners, or angles of essentially any degree of acuteness. The articles can be used in connection with optical computers, frequency and angle of incidence dependent highly reflective coatings, microcavities useful as optical resonators, totally-reflective visors, etc. The invention avoids problems inherent in connection with most current photonic band gap articles. Most current research efforts concentrate on semiconducting materials such as Si, GaAs, or InP, and are aimed at the construction of two and three-dimensional band gap structures using a variety of lithographic and etching techniques. Problems associated with these approaches include the limited ability of forming intricate, three-dimensional structures on the scales necessary for use as effective band gaps.

The present invention makes use of polymeric materials. The materials can include, but are not limited to, homopolymers, blends of homopolymer, copolymers including random and block copolymers, blends of copolymers, blends of homopolymers and copolymers, and any such systems combined with additives such as dyes, particles, heavy atoms, metallic coating materials, and the like. The systems of the present invention comprise polymeric materials, or mixtures of polymeric materials, or mixtures of polymeric materials and other, non-polymeric materials, and include two or more distinct domains of different composition and/or physical, chemical, or optical properties.

The term "domain", as used herein, defines a distinct region of the system characterized by a particular effective dielectric constant or particular effective refractive index that differs from that of surrounding or adjacent domains. Domains are not necessarily defined by a particular material. These distinct domains are comprised of species, including one or more polymeric species for at least one domain. Where a domain is defined by a polymeric species it is referred to as a "polymeric block." That is, the domains, where polymeric, are based on distinct polymeric blocks that can be comprised of a variety of components comprising distinct regions of the structure, and in each embodiment of the invention at least one domain is polymeric. The polymeric blocks typically are formed from phase-segregated, polymeric species that are immiscible with polymeric species of adjacent phases (which can define domains) from which they are segregated where the species comprising each separate phase defines separate poymeric blocks corresponding to each phase. That is, adjacent polymeric blocks that can define adjacent, distinct domains can be defined by immiscible mixtures of homopolymer species or random copolymer species, or chain regions (blocks) of a block copolymer that are comprised of a immiscible monomer sequences, or mixtures of the above with or without other non-polymeric additives, where the species in each separated phase or region formed define a polymeric block. Systems comprising multiple polymeric blocks can be comprised of one or more block copolymers or polymeric mixtures involving various blends of homopolymers and/or random copolymers with block copolymers, for example: a homopolymer or random copolymer comprising a block A with a block copolymer comprising blocks A'+B, where A and A' are miscible and are incompatible with B such that the homopolymer or random copolymer A forms a polymeric block in combination with block A' of the block copolymer and block B' of the block copolymer forms a distinct polymeric block; or a homopolymer or random copolymer comprising a block A, a block copolymer comprising polymeric blocks A'+B, and another homopolymer or random copolymer defining a block B', where A and A' together are miscible and form a polymeric block and B and B' together are miscible and form a polymeric block. It is to be understood that the preceding examples are only exemplary, and that those skilled in the art would readily conceive of additional examples which are within the scope and spirit of the invention. In one preferred embodiment, the present invention makes use of self-assembling polymeric systems, for example block-copolymeric systems and blends of various polymers that can include blockcopolymers to form one, two, and three-dimensional structures that can, in certain embodiments, be topologically connected. As used herein, "topologically connected" means continuous, in the sense that a particular domain in a periodic, polymeric structure forms a continuous pathway through the structure. This term is defined to include physical connection, or at least proximity to the extent that a photonic band gap material results.

The refractive indices of separate domains of the structures, and periodicity in structural arrangement, are tailored to meet desired criteria. The periodicity in structural arrangement is met by creating separate domains of size similar to the wavelength (in the material comprising the domain as opposed to in a vacuum (freespace)) of electromagnetic radiation desirably blocked by the band gap structure, preferably domains of size no greater than the wavelength of interest. The wavelength of electromagnetic radiation in a material can be related to the wavelength of the radiation in freespace by the following relationship: $\lambda_{material} = \lambda_{freespace}/n_{material}$ where $n_{material}$ is the effective index of refraction of the material at that wavelength. The refractive index ratios between adjacent domains should be high enough to establish a band gap in the material. Band gap can be discussed with reference to two related ratios, the dielectric constant ratio ($\epsilon_1/\epsilon_2 = n_1^2/n_2^2$) and refractive index ratio ($n_1/n_2$), where $n_1$ is the effective index of refraction of a first domain and $n_2$ is the effective index of refraction of a second domain. In general, the larger the refractive index ratio (refractive contrast) the larger the band gap and, in the present invention, band gap is tailored to be above a predetermined threshold and extends in one dimension for one-dimensional systems, two dimensions for two-dimensional systems, and three dimensions for three-dimensional systems. Preferably, adjacent, dissimilar domains differ in refractive index such that the ratio of the hrefractive index of one to the other is at least about 1.1 for a continuous set of wavelengths lying within a wavelength range of from about 100 nm to about 10 $\mu$m. or, for some embodiments, more preferably at least about 1.2, 1.3, 1.4, 1.5, 2, 4, or 7 within a wavelength range of from about 100 nm to about 10 $\mu$m. According to another set of embodiments, these preferred refractive index ratios exist for a continuous set of wavelengths lying within a wavelength range of from about 300 to about 700 nm, and according to another set of embodiments, the ratio of refractive index of one to the other is at least 1.0 for a continuous set of wavelengths lying within a wavelength range of from about 400 nm to 50 $\mu$m, and according to yet another set of embodiments, the ratio of refractive index of one to the other is at least 1.2 for a continuous set of wavelengths lying within a wavelength range of from about 50 nm to 1000 nm. These dielectric structures, exhibiting a band gap in their dispersion relation, cannot support electromagnetic waves at certain frequencies thus those waves are inhibited from propagating through the material.

The polymeric structure should be made of material that, in a disarranged state (not arranged with the periodic structure necessary for photonic band gap properties) is at least partially transparent to the electromagnetic radiation of interest. When the material is at least partially transparent to the electromagnetic radiation of interest, defects in the ordered domain structure of the photonic band gap material define pathways through which the electromagnetic radiation can pass since the criteria for blocking the radiation is destroyed.

FIGS. 1–5 are schematic illustrations that are representative of self-assembled, periodic polymeric structures arranged as photonic band gap articles. The propagation of electromagnetic radiation in the articles of the invention represented by FIGS. 1–5 is governed by Maxwell equations, and reference can be made to Joannopoulos (above) for a detailed treatment of the physics involved. In the following discussion of length scales and periodicity, for the sake of simplicity, reference will be made primarily to band gap structures comprised of two separate domains (A and B) with simple one dimensional periodicity. It is to be understood, however, that the invention encompasses systems with greater than two separate domains, and with two- or three- dimensional periodicity. In such systems, as would be understood by those of ordinary skill in the art, the determination of effective domain and periodicity length scales becomes more complex and is affected by factors such as geometric configuration, relative refractive contrast, and others. Incorporated herein by reference Joannopolous, et al. "Photonic Crystals, Molding the Flow of Light", Princeton university press, Princeton, N.J., 1995 describes such systems.

Figure 2:
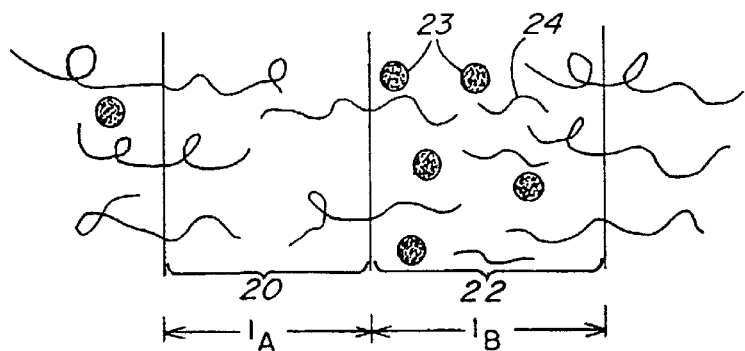
FIG. 2 is a schematic illustration of a polymeric one-dimensional photonic band gap material including auxilliary refractive index modifying and periodicity enlarging species.

Referring now to FIG. 1, a one-dimensionally periodic polymeric photonic band gap article 10 is illustrated schematically. Article 10 is made of a series of essentially planar layers 12, 14, 16, and 18 stacked in the X-Y plane, layers 12 and 16 comprising domains and being defined by a first polymeric species 20 and layers 14 and 18 being defined by a second polymeric species 22. At least one of these polymeric species can also include one or more auxiliary components such as domain dimension modifiers, processing aids, and/or refractive index-modifying species. Polymeric species 20 and 22, including any additive species, preferably differ in refractive index such that the refractive index ratio of the two polymeric species, including any additive species, is as defined above. Thus, article 10 includes a periodic structure of alternating first domains 12 and 16 and second domains 14 and 18 that are dissimilar, and differ in refractive index. Each of layers 12 and 16 has a domain characteristic dimension $1_A$ and each of layers 14 and 18 has a domain characteristic dimension $1_B$ where the domain characteristic dimensions are proportional to the end to end root mean square (RMS) length of the polymeric species, or copolymer block, comprising each layer in the phase separated state, such that the periodicity, or periodic length, L of the periodic dielectric structure can be represented, for this simple one-dimensional case, as $L = 1_A + 1_B$, and is on the order of the wavelength (in the material) of electromagnetic radiation 26 desirably blocked by the article. For more complicated configurations, the periodic length L is proportional, but not necessarily equal to the sum of the characteristic domain dimensions. When these criteria are met, exposure of the article, in a direction normal to the planes of the layers 12–18 in the Z axis, to electromagnetic radiation of a wavelength on the order of L, results in total reflection of the radiation. FIG. 2 shows an embodiment of a one-dimensional structure having polymeric blocks 20 and 22 which include blocks A and blocks B, respectively, of a diblock copolymer. Polymeric block 22 of the embodiment shown in FIG. 2 is comprised of a mixture of block B of the copolymer, particles 23, and a homopolymer C 24.

If polymeric species 20 and 22 are at least partially transparent to electromagnetic radiation 26 to which the article is exposed, and if a defect in periodicity exists in the article that disrupts the ordered, structured arrangement of the article in at least a portion, then the radiation can propagate into and/or through that defect. In one-dimensional periodic systems, a defect can be a change in the index of refraction or the thickness (1) of one layer. An observer located within a defect and looking in the direction of the periodicity will see highly reflective walls, the defect thus being useful in selective propagation of light in photonic band gap materials. A defect can be a continuous pathway, that is, a pathway having a width and a length at least ten times its width. The defect can be a void (i.e., air or other material surrounding the article), one of the polymer species 20 or 22, or any other medium at least partially transparent to the electromagnetic radiation blocked by the defect-free arrangement. Electromagnetic radiation striking the article at regions other than the defect does not propagate through the article, but radiation striking the defect passes through the article to the extent that the defect exists. The radiation of interest, in the defect, can only propagate within the defect due to essentially complete destructive interference in the article beyond the boundary of the defect. Point-like defects (hereinafter referred to as point defects), that is, defects that are small isolated regions, can be created as well, thus forming single, or multi mode cavities.

In a photonic band gap system, such as the one-dimensional photonic band gap material illustrated in FIG. 1, the separate domains 12, 14, 16, and 18 need not alternate in refractive index, but the article can be made up of polymeric species, including any additive species, in sections 12, 14, 16, and 18 that incrementally increase or decrease in refractive index. For example, section 12 can have a refractive index of 1.1, section 14 a refractive index of 1.2, section 16 a refractive index of 1.3, etc., and the article will include a refractive contrast between domains that can be useful.

Figure 3:
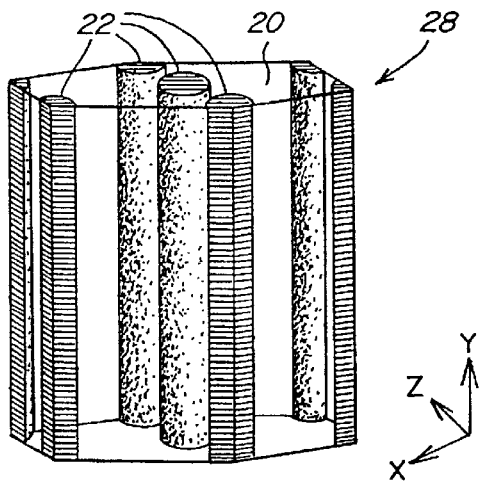
FIG. 3 is a schematic illustration of a polymeric two-dimensional photonic band gap material.

Referring now to FIG. 3, one possible configuration of a two-dimensionally periodic polymeric photonic band gap article 28 is illustrated. Article 28 includes periodicity in both the X direction and Z direction, but not in the Y direction. The article is made up of a plurality of pillars, or columns, arranged axially in the Y axis, article 28 is defined by a plurality of cylindrical polymeric domains of polymeric species 22 extending in the Y axis of the structure, separated by polymeric species 20. The article is a two-dimensional band gap structure and will reflect radiation of wavelength (in the material) on the order of the characteristic domain dimension of polymeric domain 22 in cross-section (X-Y plane), or the periodic length, which is proportional to the distance between adjacent columns. This radiation will be essentially reflected if directed at the article anywhere in the X-Z plane. The article will pass this radiation in the Y direction. A defect passing through the article in any direction in the X-Y plane, including a defect pathway including sharp corners, will propagate light and serve as a light guide. One way of creating a defect is to remove a series of columns of polymeric species 22 in a pathway.

Figure 4:
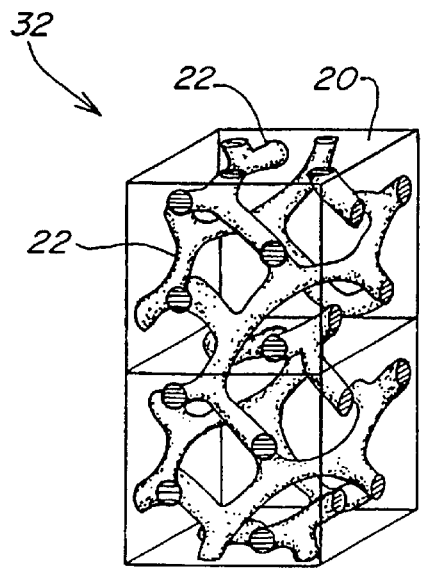
FIG. 4 is a schematic illustration of a polymeric three-dimensional photonic band gap material.

Referring to FIG. 4, a three-dimensionally periodic polymeric photonic band gap article 32 is illustrated which is periodic in terms of polymeric species 20 and 22 in each of the X, Y, and Z directions at a periodic length L. The structure of FIG. 4 is a double gyroid arrangement is of polymeric species 22 surrounded by polymeric species 20. Because periodicity in dielectric constant exists in every dimension, article 32 may be reflective to electromagnetic radiation of a wavelength on the order of L in all directions. A defect, which can be three-dimensionally non-linear (can change in direction of displacement in any direction), will pass electromagnetic radiation of wavelength on the order of L even if the defect includes sharp corners including very acute angles. Since radiation can exist anywhere within the defects and is evanescent beyond the defect boundary, light path bending at any angle including a complete reversal in direction of propagation is possible.

Figure 5:
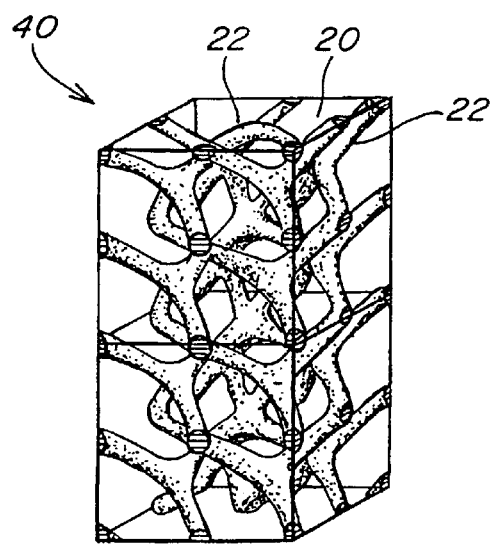
FIG. 5 is a schematic illustration of another three-dimensional photonic band gap material.

FIG. 5 illustrates a polymeric, three-dimensional photonic band gap article 40 including an arrangement of polymeric species 22, in double diamond configuration, surrounded by polymeric species 20.

Polymeric species 20 and 22 can be arranged periodically, as illustrated in FIGS. 1–5, in a variety of ways. According to one technique, polymeric species 20 and 22 define different blocks of a block copolymer. The block copolymer includes blocks of species 20 alternating with blocks of species 22, the copolymer self-assembles into a periodically ordered, structured array. Either of the species (association of blocks) 20 and 22 can also include one or more compatible auxiliary (additive) species. Auxiliary species may be desirable to control characteristic domain dimensions, refractive indices, or both. In other embodiments, a copolymer can be used that includes more than two phase separable blocks, for example a triblock copolymer.

The polymeric species used for both domains 20 and 22, are preferably below their melt temperature and preferably below their glass transition temperature at service temperatures (i.e., within a temperature range of at least from about −100° C. to about 250° C. For embodiments involving self-assembled polymeric articles, the articles are formed by a mixture of polymeric species, or block copolymer chains each including at least one first polymeric block of species 20 and at least one second polymeric block of species 22 immiscible with the first block. The polymeric species are selected such that, at a temperature above melt temperature or in solution in a suitable solvent, they are segmentally mixed and upon, for example, solidification from a melt or evaporation of a solvent from a solution the ordered structure is formed including a continuous matrix of amorphous domains. For embodiments involving block copolymers, the amorphous domains are typically defined by association of the first blocks and second blocks of the copolymer, respectively. In some embodiments, a liquid crystalline domain is incorporated that has anisotropic optical properties (indicatrix; second rank refractive index tensor).

For embodiments where the systems are self-assembled, components for forming a Apolymeric mixture or block copolymer defining species 20 and 22 as exemplified can be -selected according to the following criteria: The polymeric mixture or block copolymer forms separate domains upon phase separation occurring from solidification (including via evaporation from a solvent); one or both components can be below Tg or Tm. Species used in the polymeric mixture or defining the block copolymer form the ordered structure in a manner such that global dimensional stability of the structure exists. As used herein, "microphase separation" means a process in which polymeric blocks are locally segregated to form ordered domains.

That is, a polymeric mixture or block copolymer that defines both species 20 and 22, according to embodiments involving self-assembled articles, is an association of polymer or block copolymer chains in which inter-chain/block, non-covalent chemical attraction such as polar/polar or polar/induced polar interactions, including hydrogen bonding, or nonpolar/nonpolar interactions including Van der Waals interactions, create association between the chains that promotes domain formation while maintaining a degree of dimensional stability required for a particular application. This non-covalent, chemical attraction of species comprising polymeric blocks to each other results in unique thermodynamic and Theological behavior. At high temperatures, or in solution, the polymeric mixtures or block copolymers form isotropic phases in which the different species comprising the different polymeric blocks are randomly or, in the case of block copolymers, segmentally mixed. Upon lowering the temperature or evaporating away the solvent, or upon precipitation from solution, the repulsion between unlike species or segments increases, causing the polymeric mixture or copolymer to phase separate locally into distinct regions (For the case of block copolymers, each region is composed of one of the block components). These segregated regions subsequently organize into ordered periodic structures, the morphology of which is governed by, among other things, the relative volume fractions of the different polymeric blocks, which can depend on the molecular weight of the species comprising the polymeric blocks and presence of additives. Global dimensional stability is imparted to the material.

The following discussion on miscibility will aid those of ordinary skill in the art in selecting suitable first and second blocks for a copolymer that defines species 20 and 22, or for separate polymers that define these species, or a combination (i.e. a block copolymer that includes one or more auxiliary polymeric species associated with one or more domains). This discussion can be generalized also to a higher order block copolymer, such as a triblock (A-B-C)

copolymer. For an example of a diblock copolymer of N total segments, with a 50:50 volume composition, $\chi N>10.5$ for block segregation. The critical value of $\chi N$ is larger if the volume composition is different from 50:50. For asymmetric A-B diblock copolymer compositions, the value of $\chi$ required for block segregation can be calculated from a well-known formula by L. Leibler (Macromolecules 13, 1602 (1980)), while for A-B-A triblock copolymers, a similar formula by A. M. Mayes and M. Olvera de la Cruz (*J. Chem. Phys.* 91, 7228 (1989)) can be employed to calculate values of $\chi$ required for phase separation for any composition and molecular weight. Those of ordinary skill in the art can carry out this determination technique, and can determine the critical composition for a given diblock or triblock copolymer of any N and composition and can also use similar criteria, readily available, for other types of phase-separable polymeric mixtures.

The molecular weight of polymer or copolymer components defining species 20 and 22 should be selected to be high enough so that a segregated morphology in the service temperature range of the photonic band gap material is maintained. Specifically, the molecular weight typically is at least about 10,000, preferably at least about 15,000, more preferably at least about 25,000. In one set of embodiments the periodic length L, proportional to the sum of the characteristic domain dimensions $1_A$ and $1_B$ is related to the molecular weight of the species comprising each domain. In this set of embodiments, the molecular weight of polymer or copolymer components defining species 20 and 22 should be at least about 50,000 Daltons, more preferably at least about 100,000, more preferably still at least about 300,000, more preferably still at least about 600,000, and more preferably still at least about 2,000,000 Daltons.

A non-limiting list of polymeric or block copolymeric species can include those that are defined by or contain blocks of polystyrene, polybutadiene, polyisoprene, polycaprolactone, polyethyleneoxide, poly 2-vinyl pyridene, polydimethyl siloxane, and the like. A vast array of different block copolymers, combinations of different homopolymeric species, or combinations of block copolymeric and homopolymeric species can be used in accordance with the invention so long as other criteria described herein are met. Polymers and block copolymers can include a wide variety of side chains that exist naturally, and/or that exist to alter refractive index, segregated polymer domain size, or a combination. For embodiments where structures are self-assembled, each of the first and second polymeric blocks can be a mixture of components so long as the polymer phases separate into the ordered structure described.

Synthetic procedures such as anionic synthesis, Ziegler-Natta polymerization and ring-opening metathesis polymerization (ROMP) (see, for example, Odian, G. "Principles of Polymerization" 2d Ed., Wiley, New York; "Principles and Applications of Organotransition Metal Chemistry", Coliman, J. P., Hegedus, L. S., Norton, J. R., and Finke, R. G., University Science Books, Mill Valley, Calif., 1987, p 590; Grubbs, R. H. In *Comprehensive Organometallic Chemistry*; Wilkinson, G.; Stone, F. G. A.; Abel, E. W., Eds.; Pergamon: New York, 1982; Vol. 8, Chapter 54, p 502; Dragutan, V.; Balaban, A. T.; Dimonie, M. *Olefin Metathesis and Ring Opening Polymerization of Cycloolefins*; Wiley, New York, 1986; Dolgoplosk, B. A.; Korshak, Yu.V. *Russian Chem. Rev.*, 1984, 53, 36) are well-suited for the preparation of a block copolymeric species defining species 20 and 22 with well-defined molecular weights and compositions. Alternatively, block copolymers can be prepared by the reaction of end-finctionalized homopolymers, by addition polymerization of one block component onto arn end-functionalized homopolymer, or by sequential addition of two monomer species in a living free radical polymerization. In some embodiments, a photonic band gap article can be prepared by processing, such as melt pressing, or solvent casting techniques such as spin coating or slow evaporation. Technologies for synthesizing and processing such polymeric species are well-known to those of ordinary skill in the art, and includes roll casting or shear casting to achieve near single crystal texture (see, for example, Albalak, R. J., Thomas, E. L, "Microphase Separation of Block Copolymer Solutions in a Flow Field", *J Polym. Sci., Polym. Phys. Ed.*, p 37–46).

Adjustment of the refractive indices of polymeric species comprising domains 20 and 22 can be made by using, or synthesizing, a polymeric mixture or a block copolymer that includes species 20 and 22 of differing refractive indices; provision of a polymeric mixture or a block copolymer with different species 20 and 22 that phase separate but that do not necessarily include a requisite difference in refractive index and addition of a refractive index-adjusting additives such as an auxiliary polymer that is compatible with one of the phases only (to adjust that phase in refractive index relative to the other phase); provision of a polymeric mixture or a block copolymer with different species 20 and 22 and chemical modification of one or both of the species 20 or 22 to change dielectric constant of one or both; or the like.

Most polymeric species have a refractive index ratio of from between about 1.4 to about 1.7. Accordingly, in some instances a particular combination of polymeric species, or combination of blocks of a block copolymeric species may not have a refractive index contrast needed for establishment of a suitable band gap. For example, polystyrene and polybutadiene have a small difference in refractive index. Therefore, in a polystyrene/polybutadiene mixture or block copolymer it may be desirable to alter the refractive index of one or both of the species.

One technique for selectively altering the refractive index of one domain of a multi-domain polymeric article is to create a polymeric article including a periodic structure of a plurality of alternating separate domains, and changing the refractive index of one domain. Where a block copolymeric species is involved, this will involve changing the refractive index of one of the blocks that has phase-separated into a separate domain. One technique for changing the refractive index of a domain can involve creating a polymeric domain that includes a metal atom on a side group, and forming clusters within that polymeric domain. Formation of clusters containing metal atoms on a polymeric chain can be carried out by forming a microphase-separated structure and diffusing a reactant selectively into the polymeric domain in which it is desired to create clusters. Such a technique is described by Sankaran, et al., "Synthesis of Zinc Sulfide Clusters and Zinc Particles Within MicrophaseSeparated Domains of Organometallic Block Copolymers", *Chem. Mater.*, 5, 11 33 (1993), incorporated herein by reference. In the technique described by Sankaran, et al., block copolymers of methyltetracyclododecene (MTD) and 2,3-trans-bis ((tert-butylamido)methyl)norborn-5-ene(ZnPh)$_2$[bTAN] (ZnPh)$_2$ were prepared via ROMP to create block copolymers exhibiting either lamellar or spherical microphase-separated morphology. The zinc atoms in the organometallic domains of the block copolymers were converted to either metallic clusters of zinc or semi-conductor clusters of zinc sulfide by appropriate thermal or chemical treatment. Thermal treatment can involve heating in a bomb reactor and chemical treatment makes use of the fact that the organometallic phase of the microphase-separated structure is compatible with water, and involves treatment of the polymeric species with aqueous $H_2S$ to create ZnS in that domain. Another technique that can be used in the present invention is one similar to that described by Sohn, et al., "Processable Optically Transparent Block Copolymer Films Containing Superparamagnetic Iron Oxide Nanoclusters", *Chem. Mater.*, 9, 264–269 (1997), incorporated herein by reference. Iron oxide nanoclusters are formed, selectively, within one domain of a multi-domain phase-separated polymeric article. In the technique described, the block copolymer $[NORCOOH]_{30}[MTD]_{300}$ (NORCOOH=2-norbornene-5,6-dicarboxylic acid; MTD=methyltetracyclododecene) is synthesized using an alkylidene initiator $(Mo(CHCMe_3Ph)(NAr)(O-t-Bu)_2$ (Ar=2,6-diisopropylphenyl). The microphase-separated polymeric structure includes topologically-connected carboxylic acid-containing domains that provide a selective diffusion path for aqueous reagents. Accordingly, aqueous NaOH treatment of the assembled structure results in oxidation of iron hydroxide units to iron oxide units in the presence of ambient oxygen. Agitation of the polymeric structure can assist oxidation and flushing and agitation can be used to remove NaOH and NaCl residues. Oxide nanoclusters are formed predominantly within the interconnected domains that originally are NORCOOH. The present invention makes use of this technique for adjusting the refractive index of a polymeric domain. selectively.

In another, similar, technique, a polymeric mixture or block copolymer, does not include species with a metal atom-containing group or a moiety that is reactive with the metal atom-containing group, but includes a polymeric block that is selectively compatible with a homopolymeric species that does include a metal atom-containing group or a moiety reactive with a metal atom-containing group. Admixture of the polymeric mixture or block copolymer and the homopolymeric species results in a phase-separated structure including one set of domains carrying, selectively, the homopolymeric species. Reaction of the homopolymeric species to form nanoclusters of metal, metal oxide, metal sulfide, ceramics, semiconductors, or the like is carried out as described above to create clusters that reside, selectively or predominantly, in one domain, creating the requisite refractive index ratio. It is not requisite that nanoclusters, or clusters of any type be created according to this refractive index-adjustment technique, only that a particular domain be amenable to receiving, selectively or predominantly relative to others, a refractive index-adjusting species.

Zimmermann, et al., "High Refractive Index Films of Polymer Nanocomposites", *J. Maier. Res.*, 8, 7, 1742 (1993) describe increasing the refractive index of gelatin from 1.5 to 2.5 by creating colloidal PbS within the gelatin via agitation of a gelatin/lead acetate solution while adding hydrogen sulfide. This technique can be applicable to refractive index adjustment of domains of polymeric articles of the present invention.

In another technique, polymeric species including nanoclusters or colloidal particles of refractive index-adjusting species can be created, and later assembled into microphase-separated polymeric domains.

Another technique for adjusting the refractive index of one domain of a multi-domain polymeric article selectively is to form additives such as latex particles. and add these particles to a mixture of polymeric species (including, by definition, different blocks of a block copolymeric species) in which one of the species is compatible with the particles to an extent greater than the other polymeric species (or other block or blocks of a copolymeric species). The additive can be any refractive index-adjusting species such as metal or metal-containing nanoclusters, as described above. The compatibility of the additive for one polymeric species (or block) selectively is great enough that, when a periodic structure of alternating first and second separate domains defined by the different polymeric species is created, the additive will segregate predominantly or selectively in one species to create the requisite refractive index contrast. The additive can be added to the species prior to formation of the periodic structure or, where the additive takes the form of small enough particles, it can be diffused selectively into one or more domains in a carrier that is selectively compatible with those domains. Alternatively, it can be diffused into all domains via one or more carriers, and subsequently removed from one or more domains selectively via a flushing carrier that is compatible selectively with the domains from which the species is removed, or via a flushing carrier that is compatible with all domains where the additive is selectively incompatible with domains from which it is to be removed. In this arrangement, the additive particulate species may form a high volume percent of one type of domain in a microphase-separated structure. That is, one domain may include the particulate species at a high level, even greater than 50% by volume, and the polymeric species in that domain can define essentially a surfactant that holds the particulate species in place, and together with the particle size, determine the periodicity. This type of arrangement, in which a high-level of additive is held predominantly in one domain by a polymeric species that acts essentially as an additive, falls within the definition of a separate domain in a periodic polymeric photonic band gap structure.

In another technique for adjusting refractive index, a multi-domain structure is formed, defined by different polymeric species or different blocks of a copolymeric species, or both. a monomeric or cross-linkable species is added to the structure that migrates selectively to one domain, and that monomeric or cross-linkable species is polymerized or cross-linked in situ to form a portion of that domain. Species can be graft-polymerized onto existing polymeric species in this manner. In this technique separate monomeric or cross-linkable species can be introduced into separate domains and polymerized, cross-linked, or grafted simultaneously or sequentially to change the refractive index of more than one domain.

In another technique for adjusting refractive index of a domain, selectively, a periodic, polymeric, microphase-separated structure can be fabricated such that one domain is etchable and another is not. That is, the structure is fabricated such that exposure of the structure to an etchant will result in dissolution and removal of one phase selectively while another phase remains intact. With reference to FIG. 3, this could involve exposing article 28 to a chemical reactant that selectively removes species 22, leaving species 20 intact. This can be accomplished when species 20 is chemically inert with respect to the etchant, or is converted to a resistant material (for example, a Si-containing block can be converted to $SiO_2$) and is robust enough to maintain structural integrity upon removal of species 22. Creating a species that is robust enough to withstand the etchant can involve creating physical rigidity in species 20 via, for example, crystallinity, cross-linking, additive of a dopant selectively to species 20 that causes cross-linking, and the like. After species 22 is selectively removed, it can remain as is (defining a periodic void structure filled by surrounding fluid such as air or another fluid that includes a desired refractive index) or a second species can be added to the resultant voids and retained in situ via solidification. Solidification can involve precipitation, cross-linking, or the like.

Another technique for adjusting the refractive contrast between different polymeric phases 20 and 22 is by selective staining of one of the periodic phases with a dye.

Characteristic dimensions of the individual domains that make up the periodic band gap structure can be controlled by adjusting the length of one or more polymeric species (or blocks of a phase-separated block copolymer) that defines the structure, adjusting polymer processing conditions that increase or decrease the stacking, coiling, or other arrangement of polymer chains (or copolymer blocks), addition of homopolymers, etc. Ring-opening metathesis polymerization, reference above or anionic synthesis (Cohen, et al.; referenced above), are techniques that can find usc Gil the invention for creating polymer domains of desired size since they well-defined synthetic technique that avoids side reactions and that allows control over molecular weight of particular blocks of block copolymers, or molecular weights of polymeric species. High-molecular-weight multi-block copolymeric systems can be synthesized according to the technique by initiating a polymerization reaction and allowing the reaction to take place, with a particular repeating unit. until a desired characteristic chain length, molecular weight, or number of repeating units is achieved, then synthesizing a second block to a desired extent, and terminating the reaction or adding a third block or repeat of the first block, etc. With high-molecular weight systems, in order to achieve segregation into periodic, microphase-separated domains special processing steps may need to be taken. At higher molecular weights, a polymeric species may become more viscous, thus more time may be required for phase separation to occur. With high-molecular-weight systems, phase segregation can be carried out by dissolving the system in a suitable solvent, removing the solvent slowly and, near the order-disorder transition point, greatly decreasing the rate of solvent removal and optionally adding kinetic energy by vibrating the system via an ultrasonic apparatus, imposing oscillatory or steady shear extensional flow, exposing the system to a static or dynamic electric or magnetic field (especially where one polymeric species or block has a higher relative susceptibility to the field such as via incorporation of an auxiliary species) or combinations thereof or the like.

The size of separate polymeric domains can be controlled also via processes described above for adjustment of refractive index, such as incorporation of auxiliary particles, auxiliary homopolymeric species, auxiliary monomeric or cross-linkable species that are polymerized, grafted, and/or cross-linked in situ, and the like.

For purposes of the invention, a polymeric mixture or block copolymeric species having at least two polymeric blocks each comprised of species having a characteristic RMS chain length in a disordered state of from about 10 nm to about 2000 nm is desirable, or a polymeric mixture or block copolymeric species that self-assembles into a periodic structure having separate domains with characteristic dimensions of, in some embodiments from about 50 to about 1500 nm and in other embodiments from about 300 to 5000 nm and in yet other embodiments from about 15 to 50 nm. The periodic length L is the sum of all the lengths of the distinct dielectric domains contained in one period. For a particular embodiment for which a period contains two domains A and B (e.g. see FIG. 1), the periodic length $L=1_A+1_B$, where $1_A$ and $1_B$ are the characteristic dimensions of the A and B domains. In a particular embodiment for which both domains are defined by a pure A/B diblock copolymer with no additives, the periodic length is related to the RMS molecular chain length in the ordered state L $\infty(n_A+n_B)^{2/3}(\bar{x})$ where $n_A$ and $n_B$ are the respective number of monomer units of the separate polymer block copolymer blocks comprising the domains, and $(\bar{x})$ is the average length of the monomer repeat unit of the system, where the structure is ordered as a periodic, phase-separated structure. The relationship is $1_A+1_B=(n_A+n_B)^{1/2}(\bar{x})$ when the system is disordered. As previously discussed, for more complex systems, and systems with higher order dimensional periodicity, the relationship between the periodic length and the characteristic domain dimensions is more complex. These relationships can be used to assist selection of species for use in the invention. Typically, molecular weights of these species will be according to the preferred values noted above. In another embodiment, the periodic, phase-separated polymeric article includes separate domains each made up of at least about $1\times10^3$ monomer units per domain chain component, preferably at least $5\times10^3$, and more preferably at least about $1\times10^4$ monomer units. This can be adjusted, however, to achieve the desired domain size where a particular domain includes repeating units of particularly high molecular weight, or including side groups that are relatively large and that thereby increase the size of the domain disproportionately to the number of repeat units.

A system can include, in addition to the polymeric species, solvent, preferably nonvolatile, in an amount useful in swelling one or both domains, e.g. mineral oil in a polybutadiene/styrene copolymer which will swell the polybutadiene domain. This can be used to control the size of one or more domains. The system can also include other polymeric or non-polymeric additives for modification of domain dimension, dielectric constant/refractive index, or processibility. In addition, a suitable non-polymeric additive can also constitute a separate phase/domain within the photonic band gap structure.

A series of screening techniques can be used to select appropriate polymeric species for use in the polymeric, photonic band gap articles of the invention which include screening of constituent materials, process screening, and optical response screening. In a first test, an absorption measurement is carried out for each constituent of the final material, individually or in combinations, which comprise the domain compositions (e.g. a homopolymer corresponding to each polymeric block type, pure crystallite film, or a combination). Also, a disordered arrangement of the polymeric species (block copolymeric species, mixture of homopolymeric species, etc.) is provided (an arrangement not phase-separated into domains with periodicity on the order of the wavelength of applied radiation) and irradiated to determine its degree of transparency. A material of a useable thickness that is sufficiently transparent and is not totally absorbent throughout the wavelength range of interest is potentially useful.

In another test, materials are selected for suitable dielectric constants. This test can entail performing index of refraction measurements, using an ellipsometer, on a thin film of a pure species or mixture defining a domain composition. The index of refraction of refraction can be determined using transmission or reflectivity measurements as a function of wavelength and comparing them to a desirable calculated response (Joannopolouus, et al.). The materials should also be screened for the ability to form structures with appropriate characteristic domain dimensions and periodic length scales. For embodiments using block copolymers, this can be done by measuring the molecular weight of the block copolymers using Nuclear Magnetic Resonance (NMR), Low Angle Laser Light Scattering, or Mass Spectrometry.

Planning and simple screening tests can be used to assess the relative compatibility of components including miscibility, phase separation, chemical stability, and processing stability in order to select suitable components for use as polymeric species 20 and 22, whether they be separate species, different blocks of a block copolymeric species, or a combination. A first and second species should be comprised of components that are immiscible at an appropriate molecular weight and composition. The $\chi$ parameter, which is extensively tabulated for a wide range of polymers, can be used to predict miscibility. Once a particular set of species is selected, they can be mixed (if not defined by a block copolymer) and screened for suitability for use in the invention by analysis via differential scanning calorimetry. If two glass transition temperatures are observed, then the two species (or two blocks of a block copolymer) are immiscible, that is, the desired phase separation has taken place. If only one glass transition temperature is observed, then the components are miscible and phase separation has not occurred, or the glass transition temperatures of the differing species or blocks are coincidentally similar. For the latter situation, if one glass transition temperature is observed, another screening test involving small angle scattering measurements can determine whether phase separation has occurred. Melt temperature and the existence of crystallinity are readily determined by thermal analysis techniques such as DSC or DTA.

Another test involves subjecting the polymeric material or block copolymer to heat and determining the resistance to flow. If the material flows easily as a liquid, microphase separation and resulting dimensional stability at the test temperature does not exist.

Processing methods should also be screened for suitability with desired materials. For example, processing temperatures should be below degradation temperatures. Also, the types and magnitude of the physical forces applied during processing should be conducive to successful assembly of photonic band gap systems, and thus should be able to guide one or more assembly/partioning events, which give rise to dielectric domains and a proper assembly of the domains into the periodic band gap structure. Processing methods should be avoided that lead to the proliferation of undesired imperfections or that induce undesired physical damage to the materials or structure. The formation of a periodic structure possessing suitable characteristic domain dimensions and periodic length and composition can be verified by small angle x-ray measurements (SAXS), transmission electron microscopy (TEM), optical microscopy, atomic force microscopy (AFM). These methods can also be used to inventory imperfections in the structure.

As another screening test, if creation of photonic band gap materials including phase-separated domains with periodicity on the order of the wavelength of the desired electromagnetic radiation is difficult, but fabrication of phase-separated articles including larger domains is simpler, then a band gap material including domains on the order of, for example, the wavelength of microwaves can be fabricated and tested to determine its properties. If a useful band gap material results, then the material can be adjusted for formation of phase-separated domains of characteristic dimension suitable for the radiation of interest. In some embodiments this characteristic dimension is on the order of 50–1500 nanometers. In other embodiments, the characteristic dimension is on the order of 15–50 nm, and in yet other embodiments, the characteristic dimension is on the order of 300 nm to 5000 nm. The ultimate screening test is the determination of the optical response of the assembled periodic structure and its usefulness as a photonic band gap article over the frequency range of interest. This can be done by comparing calculated and measured dispersion relations while taking proper account of the finite dimensions of the system.

Radiation-propagating or radiation-containing defects or single or multimode cavities can be created in the polymeric, photonic band gap articles 10, 28, and 32 of the invention in a variety of ways. In one-dimensional periodic structures a change in refractive index of one lamellae, or a change in the dimensions of one layer, for example by inserting a layer of another material, or use of an ABC multiblock blended with an AC diblock—effectively creating one layer of B in the multiblock AC system, can be carried out. In two-dimensional structures a point defect can be created by removing a cylinder with a laser or adding latex cylinders before or during formation of the structure. With reference to the structure of FIG. 3, a defect can be created by removing, selectively (via irradiation, etching, or the like) a contiguous series of cylinders of polymeric species 22. A line defect can be formed in two-dimensional and three-dimensional structures by magnetically guiding a heated sphere through the material. A line defect also can be created by drilling a hole, for example using an intense laser beam. A point defect in a three-dimensional structure can be made by adding latex spheres where the size and the index of refraction of the sphere can be controlled. Plane defects can be formed by cutting a three-dimensional structure along a specific plane, rotating the two pieces, and rejoining them together. Cutting a along a specific plane, rotating the two pieces, and rejoining them together can also be used to create a composite structure with a higher effective dimensionality than the initial structure. For example the two-dimensional system shown in FIG. 3 can be bisected along one or more X-Z planes, the sections can then be rotated relative to each other by an angle $\theta$ (or different angles for different pairs of sections), and rejoined so that the cylinders 22 are no longer continuous across the planes of bisection (i.e. they are misaligned). This new system can now act as a three-dimensional photonic band gap structure. Point or line defects also can be created by manipulation of intersecting beams of radiation, for example laser beams, ion beams, electron beams, or the like, where the intersecting beams alter the structure enough to create a defect but, along regions of each beam other than the intersecting portions, a structure remains unchanged. In another technique, a hot magnetic particle can be guided through a structure to create a "burned" pathway that defines a defect by using an alternating current electrical field to heat the particle and steering the particle by use of a direct current or magnetic field.

Another technique for forming defects is via manipulation of processing procedures. For example, anisotropy may be induced in certain directions by applying an external field or by roll casting. Where the defects are point defects, for example by incorporation of an impurity into one or both of the polymeric phases, or introduction of an impurity that will be pinned at polymeric phase interfaces, optionally followed by removal of the impurity via etching or the like, a single-mode resonant optical cavity is defined. A three-dimensional, to polymeric photonic band gap structure with a point defect can be used to suppress or induce spontaneous emission from excited atoms placed in those defects. This can be used as a photonic bit or data storage item.

As mentioned above, a variety of polymeric species, including combinations of polymeric species, can be used to create the periodic polymeric photonic band gap structure of the invention. Where block copolymers are used, they can be linear block copolymers, "comb" copolymers, star copolymers, radial teleblock copolymers, dendrimers, or a combination. Those of ordinary skill in the art can select suitable polymers or combinations of polymers to create the phase-separated structure of the invention.

The function and advantage of these and other embodiments of the present invention will be more fully understood from the examples below. The following examples are intended to illustrate the benefits of the present invention, but do not exemplify the full scope of the invention.

EXAMPLE 1

Formation of Polymeric Photonic Band Gap Article

This prophetic example describes how one would fabricate a polymeric photonic band gap article.

A block copolymeric species of methyltetracyclododecene (MTD) and [2,3-trans-bis((tert-butyl-amido) methyl)norborn-5-ene] [$ZnPh_2$ are synthesized as described in Sankaran, et al., *Chem Mater.*, 5, 1133 (1993), incorporated herein by reference. A ring-opening metathesis polymerization technique is used and the polymer is synthesized using an amount of precursor and for a length of time sufficient to create blocks each of approximately 500,000 Daltons in molecular weight. The reaction takes place in benzene, vacuum distilled from $CaH_2$ and stored over NaK and filtered through a sintered glass frit prior to use. The reaction is terminated with pentadiene.

Periodic structures of alternating separate copolymeric domains are created by casting from solution while, near the point of complete removal of benzene, the system is exposed to ultrasonification for approximately 10 hours while the remainder of the solvent is gradually removed. The polymeric structure then is exposed to $H_2S$ vapors in a suitable solvent for a period of 20 hours. Following this reaction, the polymer is exposed to atmosphere and excess $H_2S$ gas is allowed to dissipate for a period of time of 6–10 hours. The sample is further evacuated at 100° C. for 12 hours. The result is a phase-separated article including ZnS clusters in the nanometer size range in one domain selectively, the overall structure having a refractive index ratio between domains of approximately 1.5. If the particular requisite refractive index contrast is not achieved, another refractive index-adjusting species, such as an aqueous dye, is added. Characterization of the resulting polymeric structure is carried out as follows. Molecular weight characterization uses gel permeation chromatography and light scattering. X-ray photoelectron spectroscopy is used to characterized the particulate structure, and NMR spectroscopy (including proton NMR) is used to characterize the block copolymer. A three-dimensional periodic structure results.

A linear defect is created in the structure by guiding a heated article through the structure, the heat supplied by an alternating current field, and the particle being guided through the structure by a direct current field.

EXAMPLE 2

Formation of a One-dimensional Polymeric Photonic Band Gap Article Comprising Alternate Layers of High and Low Index of Refraction This example demonstrates the self assembly of a structure of periodically occurring first and second separate dielectric domains in the presence of a flow field. The structure in this example exhibited one dimensional periodicity. The dielectric domains were present in a polymeric article constructed from a P2VP/PI/PS triblock copolymer and an auxiliary refractive index modifying species residing primarily in one of the domains. The domain characteristic size was approximately 20 nm for the article fabricated according to this example for both the high and low dielectric constant domains, and the refractive index ratio was estimated to be above 1.1. The fabrication procedure used in this example is general and can be used to fabricate a large number of potentially useful one, two and three dimensional periodic structures at different length scales and refractive indices. To demonstrate the flexibility of the procedure we chose to make a layered dielectric structure. The characteristic dielectric domain length scale was controlled in this example primarily by the length of the block copolymer and by the volume of added auxiliary species. This length scale can be increased by using higher molecular weight polymers or via other methods described previously.

The structure was fabricated using a block copolymer and a dielectric constant enhancing additive. The block copolymer was comprised of poly-2 vinyl pyridine (P2VP), polyisoprene (PI), and polystyrene (PS). The dielectric constant enhancing additive was comprised of CdSe crystallites coated with a surface modifying group (tri-octyl phosphine oxide) that had an affinity to one of the blocks (P2VP). The CdSe crystallites were initially dispersed in tetrahydrofuran (THF) and were approximately 3 nm in diameter. The crystallites were prepared according to a procedure outlined in Murray et al. ("Synthesis and Characterization of Nearly Monodisperse CdE (E=S, Se, Te) Semiconductor Nanocrystallites". J. Am. Chem. Soc. 115, 8706, (1993)).

The articles were prepared as follows. To 2.4 ml of a THF solution of crystallites at a concentration of 0.1 mol/liter was added 0.6 g of PS/PI/P2VP triblock copolymer was added. The molecular weights of the blocks were 23,000 Da, 53,000 Da, and 23,000 Da for the PS, PI, and P2VP respectively. The total molecular weight of the block copolymer was chosen to give a periodicity distance which corresponded to the desired optical band gap range.

The CdSe nanocrystallies, prepared according to the procedure of Murray et al, were coated with the bi-functional surface modifying group trioctyl phosphine oxide (TOPO). Each modifying group had a head group which bound or coordinated to the nanocrystallite surface and a tail which was miscible in one of the blocks (P2VP).

The block copolymer and the crystallites were mixed, roll cast at 40 RPM according to the procedure outlined in Albalak and Thomas (1993). The article was then annealed at 120° C. under vacuum for 48 hr yielding an article with a periodic dielectric structure.

The structure of the article was analyzed as follows. Portions of the article were thin sectioned using an ultra microtome and sections were transferred to 600 mesh copper grids.

The sections were stained for 1 minute in a iodine rich atmosphere followed by staining with osmium tetroxide ($OsO_4$)for contrast. TEM images of the sections were then obtained on a JEOL 2000 TEM at various magnifications.

The small angle x-ray diffraction(SAXS) pattern of the material was measured using a Rigaku 18 KW rotating anode x-ray generator and a Siemens small angle diffractometer with Siemens HI-STAR area detector.

Figure 6:
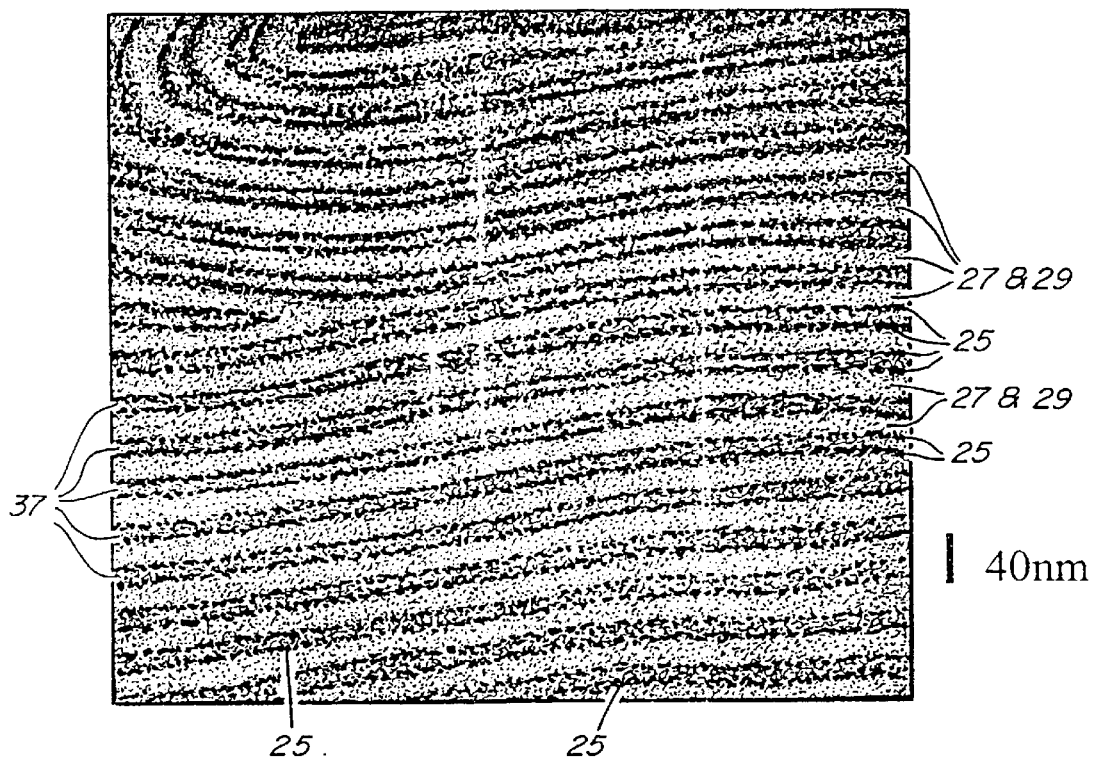
FIG. 6 is a Transmission electron microscope micrograph of a layered photonic band gap polymer system showing the formation of periodic dielectric domains.
Figure 7:
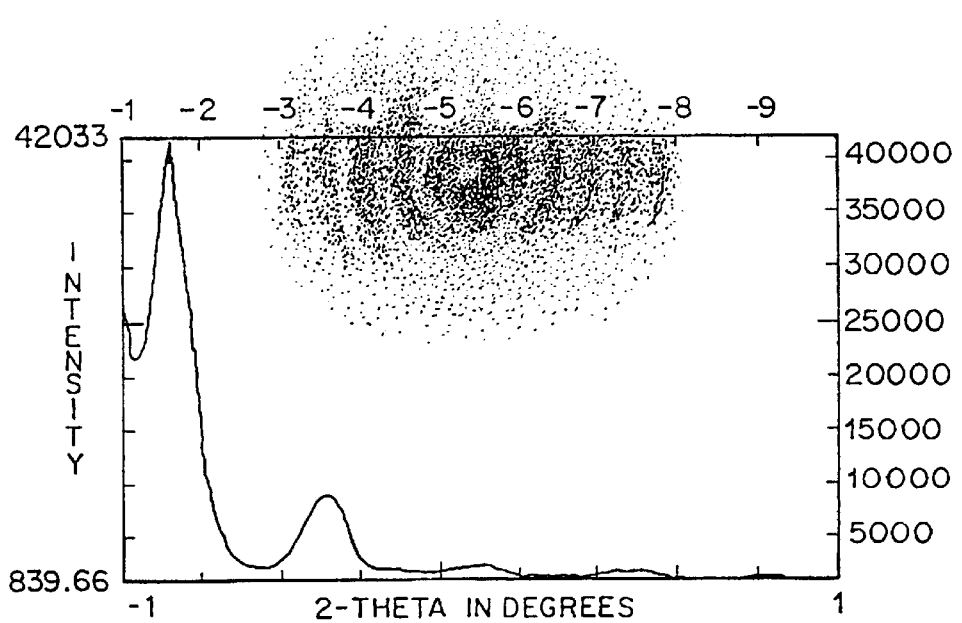
FIG. 7 is a Small Angle X-ray trace of a layered periodic high dielectric contrast photonic band gap polymer system.

The sample prepared as described above exhibited both nanocrystallite sequestering and long range order. The identification of the CdSe rich phase and the structure was conducted by TEM using a light Iodine staining (~1 minute) and $OSO_4$ staining of the sections. A typical electron photomicrograph of a section is shown in FIG. 6. The figure indicates that the system was a layered, periodic structure with the trioctyl phosphine capped CdSe particles 25 sequestered into the Poly 2-vinyl pyridine phase 37. The volume fraction of the particles in the sequestering phase was approximately 15%. The structure formed was a layered structure of ABCCBAABC type where B 27 was isoprene, A 29 was polystyrene, and C 26 was the CdSe-incorporating P2VP phase. The apparent reason for the sequestering of CdSe into the P2VP phase was the existence of a Lewis Base nitrogen in that phase which coordinated to the surface of the CdSe particle. Pi-pi orbital interactions in the PS phase and the non-polarity of the PI phase did not favor the polar CdSe particle surfaces. The periodicity length was approximately 40 nm. The long range order in this sample was achieved by a combination of roll casting and annealing at 120° C. for 48 hr. FIG. 7 shows the SAXS pattern of the system as prepared indicating displaying a significant anisotropy indicating a globally alligned structure.

EXAMPLE 3

Formation of a Two Dimensional Periodic Band Gap Structure Consisting of High Dielectric Constant Cylinders on a Triangular Lattice in a Low Dielectric Constant Matrix This example demonstrates the self assembly of a structure of periodically occurring first and second separate dielectric domains in the presence of a flow field. The structure in this example exhibited two dimensional periodicity. The dielectric domains were present in a polymeric article constructed from a PS/PI/PS triblock copolymer and an auxiliary refractive index modifying species, which were CdSe nanocrystals, residing primarily in one of the domains. The domain characteristic size was approximately 15 nm for the article fabricated according to this example for both the high and low dielectric constant domains, and the refractive index ratio was estimated to be above 1.1. The fabrication procedure used in this example is general and can be used to fabricate a large number of potentially useful one, two and three dimensional periodic structures with different length scales and refractive indices. To demonstrate the flexibility of the procedure we chose to make a layered dielectric structure. The characteristic dielectric domain length scale was controlled in this example primarily by the length of the block copolymer and by the volume of added auxiliary species. This length scale can be increased by using higher molecular weight polymers or via other methods described previously. The dielectric contrast can be increased by increasing the volume of the auxiliary refractive index modifying species or by other means previously described.

The structure was fabricated using a block copolymer and a dielectric constant enhancing additive. The block copolymer comprised polystyrene (PS) and polyisoprene (PI) blocks. The dielectric constant enhancing additive comprised CdSe crystallites coated with a surface modifying group (tri-octyl phosphine oxide (TOPO)) which had an affinity to one of the blocks (in this case to the PS). The CdSe crystallites were initially dispersed in toluene and were approximately 3 nm in diameter. The crystallites were prepared according to the procedure outlined in Murray et al. (1993).

The sample preparation procedure was as follows. 3.05 nm diameter TOPO capped CdSe crystallites in toluene were prepared according to Murray et al. (1993) at a concentration of approximately. 0.7 g of DEXCO4211 SIS (11.7k–46k–11.7k) polymer was dissovled in 2 ml of toluene. To this solution was added 0.05 g of amine terminated PS 2,600 Da (Polymersource, Quebec City, Canada). The solution was thoroughly mixed. The solution of CdSe crystallites in toluene was then added to the solution. The resulting material was then roll cast at 40 RPM and annealed under vacuum for 72 hr to produce the final polymeric article.

The structure of the article was analyzed by TEM and SAXS as previously described.

Figure 8:
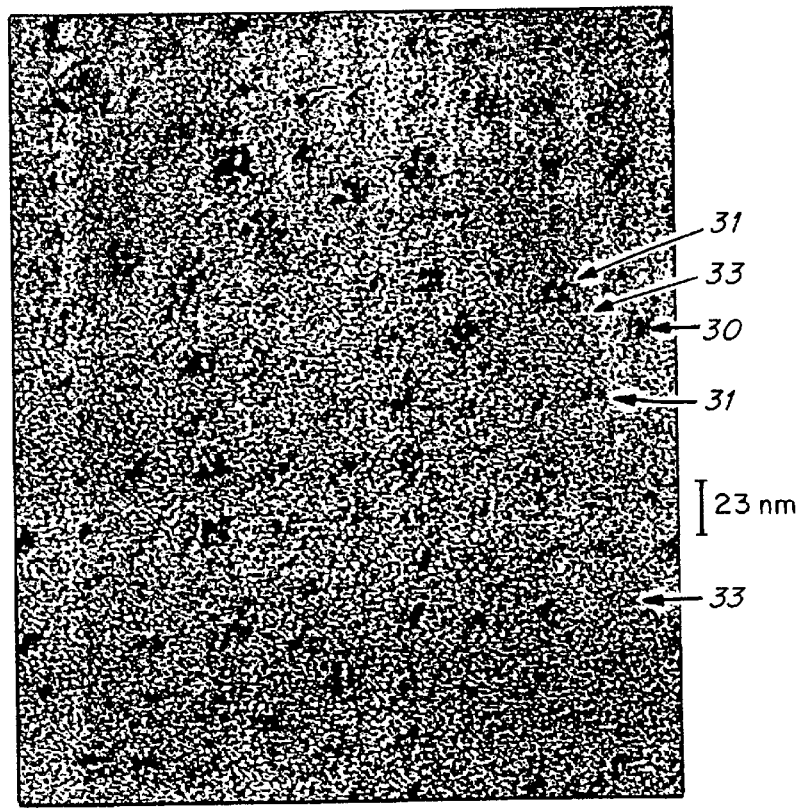
FIG. 8 is a Transmission electron microscope micrograph of a two-dimensional photonic band gap polymer system comprising cylinders on a triangular lattice showing the formation of periodic dielectric domains.
Figure 9:
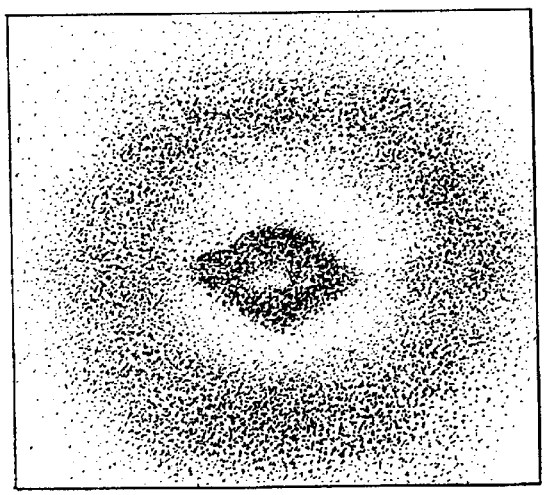
FIG. 9 is a Small Angle X-Ray trace of a layered periodic high dielectric contrast twodimensional photonic band gap polymer system.
Figure 10:
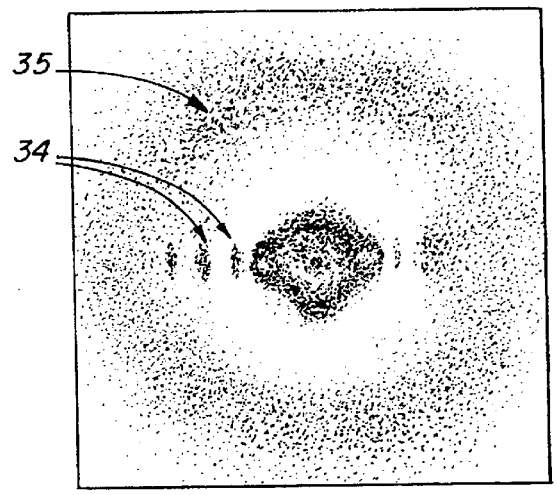
FIG. 10 is a Small Angle X-Ray trace of a layered periodic high dielectric contrast twodimensional photonic band gap polymer system with global order enhanced by annealing.

The resultant structure consisted of cylinders of PS in a matrix of PI. The CdSe particles were sequestered in the PS cylinders. A typical TEM photomicrograph of the structure is shown in FIG. 8 indicating that CdSe nanocrystals 30 sequestered in the PS rods 31, which were separated by PI matrix 33. The amine terminated PS chains played an instrumental role in the sequestering process. Indeed, TOPO capped CdSe nanocrystallites are immiscible in a SIS triblock and will phase separate into micron-size clumps 30. The center to center distance between adjacent cylinders in this structure was approximately 27 nm. The small angle scattering pattern (FIG. 9) displays an anisotropic horizontal diffraction peak pattern 34, corresponding to a triangular lattice, and an isotropic scattering ring 35 corresponding to a single particle scattering on the outer edge of the ring and 35 particle diameter object on the inner. The effect of annealing on the long range order can be observed by comparing the number of diffraction orders present prior to annealing (FIG. 9) and after a 72 hr annealing period (FIG. 10). There is little isotropic scattering at larger length scales this is in agreement with the sequestering event and the isolation of the sequestering phase.

EXAMPLE 4

Preparation of a One Dimensional Periodic Band Gap Structure Comprising Alternating Layers of High and Low Index of Refraction This prophetic example shows how one would fabricate a self assembled structure of periodically occurring first and second separate dielectric domains. Self assembly occurs in the presence of a flow field. The structure in this example exhibits one dimensional periodicity. The dielectric domains are present in a polymeric article constructed from a P2VP/PI/P2VP triblock copolymer and an auxiliary refractive index modifying species residing primarily in one of the domains. The domain characteristic size is approximately 400 nm for the article fabricated according to this example for both the high and low dielectric constant domains, and the refractive index ratio is estimated to be above 1.1. The fabrication procedure used in this example is general and can be used to fabricate a large number of potentially useful one, two and three dimensional periodic structures with different length scales and refractive indices. In this prophetic example, we demonstrate how one would use the procedure to fabricate a one dimensional dielectric periodic structure. The characteristic dielectric domain length scale is controlled in this example primarily by the length of the block copolymer and by the volume of added auxiliary species. The length scales and dielectric contrast can be manipulated by means previously described.

The structures according to the present prophetic example are fabricated from a block copolymer and a dielectric constant-enhancing additive. The block copolymer is comprised of poly-2 vinyl pyridine (P2VP) and polyisoprene (PI). The dielectric constant-enhancing additive can be comprised of CdSe crystallites coated with a surface-modifying group (e.g. tri-octyl phosphine oxide (TOPO)) that is designed to have an affinity for one of the blocks of the block copolymer (for the case of TOPO-coated CdSe crystallites to the P2VP block). The CdSe crystallites, approximately 3 nm in diameter, are prepared according to the procedure given in Murray et al (1993) and are initially dispersed in tetrahydrofuran (THF).

The fabrication procedure of the polymeric band gap article proceeds as follows. An ABA-type triblock copolymer is synthesized or obtained (in other examples, a diblock or star or higher order block copolymer may be used) with 2 vinyl pyridine (P2VP) as block A and poly isoprene as block B. The molecular weights of the blocks are about 400 (kilograms/mol) for the poly-2-vinyl pyridine blocks (sum of two A blocks) and about 800 (kilograms/mol) for the poly isoprene block. These particular molecular weights are chosen to give alternate layers of P2VP and poly isoprene (PI) which yield a periodic structure with domain dimensions of 400 nm useful as a band gap for radiation in the range near 2.5 $\mu$m wavelength. The total molecular weight of the block copolymer is chosen to give a periodic length which is on the order of the wavelength in the material of the desired band gap 2.5/1.5.

Crystallites, which can comprise CdSe nanocrystallites or any other high dielectric crystallite (such as CdTe AlTe GaAs and others), are synthesized or obtained that have an effective diameter that is smaller than the average domain size of the final polymer article. The nanocrystallites are coated with a surface modifying group, such as trioctyl phosphine oxide or other surface modifiers having a bi-functional chemical structure including a head group, which binds to or coordinates with the nanocrystallite surface, and a tail which is miscible in one of the blocks of the copolymer. The volume of the nanocrystallites added is chosen so that upon sequestering into one of the domains, the effective index of refraction of that domain is enhanced to a desired value and a desired morphology is attained. For example, adding 0.5 ml of CdTe crystallites with an index of refraction of n=3.05 at 0.55 $\mu$m wavelength to 0.5 ml of P2VP with an index of refraction of about 1.5 at 0.55 $\mu$m will yield an effective index of refraction for the mixture of about n=2.28. The index of the sequestering phase can be increased by increasing the volume fraction of nanocrystallites or by choosing crystallites of higher index of refraction at the wavelength of interest. The volume of nanocrystallites chosen in this specific example (to give layers) should equal approximately the volume of the P2VP. The volume of the crystallites can be determined from their density and their molar concentration and weight.

The block copolymer and the crystallites are then mixed and a processing method is chosen that will enable removal of the solvent and aid formation of long range order. For example, the sample can be roll cast using the procedure outlined in Albalak et al. Or roll cast and annealed in a vacuum oven (for at least a few hours to a few days) with the temperature set at above the Tg of the two blocks. Alternatively, the sample can be evaporation cast onto a substrate with a surface treated to be preferentially interact with one of the blocks. For example, a glass surface can be used that has been dipped in Hexamethyldisilazane making it preferential interact with the PI block. Using the procedure above, a periodic dielectric lattice can be synthesized with a structure similar to that shown in FIG. 6 SAXS pattern similar to that shown in FIG. 7.

EXAMPLE 5

Preparation of a Two Dimensional Periodic Band Gap Structure Comprising Cylinders With Relatively High Effective Index of Refraction Oriented on a Triangular Lattice in a Matrix With Relatively Low Effective Index of Refraction This prophetic example shows how one would fabricate a self assembled structure of periodically occurring first and second separate dielectric domains arranged to exhibit two-dimensional periodicity with self assembly occurring in the presence of a flow field. As in prophetic example 4, the dielectric domains are present in a polymeric article constructed from a P2VP/PI/P2VP triblock copolymer and an auxiliary refractive index modifying species residing primarily in one of the domains. The domain characteristic size would be approximately 200 nm for the high dielectric constant cylindrical domains with a center-to-center spacing of about 400 nm. The refractive index ratio is estimated to be above 1.1. The fabrication procedure used in this example is a modification of that described in example 4 and is general and can be used to fabricate a large number of potentially useful one, two and three dimensional periodic structures with different length scales and refractive indices. In this prophetic example, we demonstrate how one would use the procedure to fabricate two dimensional dielectric periodic structures comprised of cylinders on a triangular lattice. The characteristic dielectric domain length scale is controlled in this example primarily by the length of the block copolymer and by the volume of added auxiliary species. The length scales and dielectric contrast can be manipulated by means previously described.

The structure according to the current prophetic example is fabricated from an ABA type triblock copolymer with P2VP comprising block A and PI comprising block B. The fabrication procedure is similar to that outlined in example 4 including the following modifications. The molecular weights of the blocks are about 280 (kilograms/mol) for the poly-2-vinyl pyridine blocks (sum of the two A's) and about 1300 (kilograms/mol) for the polyisoprene block. These particular molecular weights are chosen to yield a structure comprising cylinders of P2VP in a matrix of polyisoprene (PI). These particular molecular weights are chosen to yield cylinders of P2VP in a matrix of poly isoprene (PI) which yield a periodic structure with domain dimensions of 100 nm useful as a band gap for radiation in the wavelength range near 200 nm. The total molecular weight of the block copolymer is chosen to give a periodic length of about 400 nm which is on the order of the wavelength range of the desired band gap.

The crystallites in the current example are coated with TOPO and sequester into the P2VP phase. In addition, the volume of nanocrystallites chosen in this specific example (to give cylinders) should be such that the volume fraction of the combined phase comprising P2VP and crystallites is between approximately 0.2 and 0.32 based on the total volume of the system (P2VP+crystallites and PI).

EXAMPLE 6

Preparation of a Three Dimensional Periodic Band Gap Structure Comprising a Double Gyroid This prophetic example shows how one would fabricate a self assembled structure of periodically occurring first and second separate dielectric domains arranged to exhibit three-dimensional periodicity with self assembly occurring in the presence of a flow field. In the present example, the dielectric domains are present in a polymeric article constructed from a PS/PI/P2VP triblock copolymer and an auxiliary refractive index modifying species residing primarily in one of the domains. The domain characteristic size would be approximately 100 nm for the high dielectric constant domains and 300 nm for the low dielectric constant domains. The refractive index ratio is estimated to be above 1.1. The fabrication procedure used in this example is a modification of that described in example 4 and is general and can be used to fabricate a large number of potentially useful one, two and three dimensional periodic structures with different length scales and refractive indices. In this prophetic example, we demonstrate how one would use the procedure to fabricate three-dimensional dielectric periodic structures comprising a double gyroid configuration. The characteristic dielectric domain length scale is controlled in this example primarily by the length of the block copolymer and by the volume of added auxiliary species. The length scales and dielectric contrast can be manipulated by means previously described.

The structure according to the current prophetic example is fabricated from an ABC type triblock copolymer with P2VP comprising block A, PI comprising block B, and polystyrene (PS) comprising block C. The fabrication procedure is similar to that outlined in example 4 including the following modifications. The molecular weights of the blocks are about 100 (kilograms/mol) for the poly-2-vinyl pyridine blocks (block A), about 800 (kilograms/mol) for the polyisoprene block (Block B), and about 200 (kilograms/mol) for the polystyrene block (Block C). These particular molecular weights are chosen to yield a structure comprising a double gyroid, with P2VP ans PS each forming separate continuous phases within a matrix of PI. These particular molecular weights are chosen to yield a periodic double gyroid structure.

The crystallites in the current example are coated with TOPO and sequester into the P2VP phase. In addition, the volume of nanocrystallites chosen in this specific example, for a double gyroid structure, should be such that the volume fraction of the combined glassy phases (P2VP+crystallites and the separate PS phase) is between approximately 0.32 and 0.37 based on the total volume of the system (P2VP+ crystallites and PS and PI).

EXAMPLE 7

Preparation of a One Dimensional Periodic Band Gap Structure Comprising Alternating Layers of High and Low Index of Refraction This prophetic example shows how one would fabricate a self assembled structure of periodically occurring first and second separate dielectric domains arranged to exhibit one-dimensional periodicity with self assembly occurring in the presence of a flow field. In the present example, the dielectric domains are present in a polymeric article constructed from a PS/PI/PS triblock copolymer and an auxiliary refractive index modifying species residing primarily in one of the domains. The domain characteristic size would be approximately 400 nm for the high and low dielectric constant domains (layers). The refractive index ratio is estimated to be above 1.1. The fabrication procedure used in this example is a modification of that described in example 4 and is general and can be used to fabricate a large number of potentially useful one, two and three dimensional periodic structures with different length scales and refractive indices. The characteristic dielectric domain length scale is controlled in this example primarily by the length of the block copolymer and by the volume of added auxiliary species. The length scales and dielectric contrast can be manipulated by means previously described.

The structure according to the current prophetic example is fabricated from an ABA type triblock copolymer with PS comprising block A and PI comprising block B. The fabrication procedure is similar to that outlined in example 4 including the following modifications. The molecular weights of the blocks are about 800 (kilograms/mol) for the PS blocks (sum of the two A's)and about 800 (kilograms/mol) for the PI block. These particular molecular weights are chosen to give alternate layers of P2VP and poly isoprene (PI) which yield a periodic structure with domain dimensions of 400 nm useful as a band gap for radiation in the wavelength range around 2.5 $\mu$m. The total molecular weight of the block copolymer is chosen to give a periodic length which is on the order of the wavelength range 2.5/1.5 of the desired band gap.

The crystallites in the current example are coated with a bi-functional surface modifying group, such as amine- or thiol-terminated polystyrene which have preferential affinity for the PS and thus sequester into the PS phase. The volume of the nanocrystallites added is chosen so that upon sequestering into one of the domains, the effective index of refraction of that domain is enhanced to a desired value and a desired morphology is attained. For example, adding 0.5 ml of pure CdTe crystallites with an index of refraction of n=3.05 at a wavelength of about 0.55 $\mu$m to 0.5 ml of PS with an index of refraction of about 1.5 at 0.55 $\mu$m will yield an effective index of refraction for the mixture of about n=2.28. The index of the sequestering phase can be increased by increasing the volume fraction of nanocrystallites or by choosing crystallites of higher index of refraction at the wavelength of interest. In addition, the volume of nanocrystallites chosen in this specific example (to give a layered structure) should equal approximately the volume of the PS.

EXAMPLE 8

Preparation of a Two Dimensional Periodic Band Gap Structure Comprising Cylinders With Relatively High Effective Index of Refraction Oriented on a Triangular Lattice in a Matrix With Relatively Low Effective Index of Refraction This prophetic example shows how one would fabricate a self assembled structure of periodically occurring first and second separate dielectric domains arranged to exhibit two-dimensional periodicity with self assembly occurring in the presence of a flow field. In the present example, the dielectric domains are present in a polymeric article constructed from a PS/PI/PS triblock copolymer and an auxiliary refractive index modifying species residing primarily in one of the domains. The domain characteristic size would be approximately 200 nm for the high dielectric constant cylinders with a center-to-center distance between cylinders of about 400 nm. The refractive index ratio is estimated to be above 1.1. The fabrication procedure used in this example is a modification of that described in example 7 and is general and can be used to fabricate a large number of potentially useful one, two and three dimensional periodic structures with different length scales and refractive indices. In this prophetic example, we demonstrate how one would use the procedure to fabricate two dimensional dielectric periodic structures comprised of cylinders on a triangular lattice. The characteristic dielectric domain length scale is controlled in this example primarily by the length of the block copolymer and by the volume of added auxiliary species. The length scales and dielectric contrast can be manipulated by means previously described.

The structure according to the current prophetic example is fabricated from an ABA type triblock copolymer with PS comprising block A and PI comprising block B. The fabrication procedure is similar to that outlined in example 7 with the following modifications. The molecular weights of the blocks are about 280 (kilograms/mol) for the PS blocks (sum of the two A's) and about 1291 (kilograms/mol) for the PI block. These particular molecular weights are chosen to yield a structure comprising cylinders of PS in a matrix of PI. These particular molecular weights are chosen to yield cylinders of PS in a matrix of PI which yield a periodic structure with domain dimensions of 100 nm and 200 nm useful as a band gap for radiation in the wavelength range around 300 nm. The total molecular weight of the block copolymer is chosen to give a periodic length which is on the order of the wavelength range (around 300 nm) of the desired band gap.

The crystallites in the current example are coated with amine- or thiol-terminated polystyrene and sequester into the PS phase. In addition, the volume of nanocrystallites chosen in this specific example (to give a triangular lattice of cylinders) should be such that the volume fraction of the combined phase comprising PS and crystallites is between approximately 0.2 and 0.32 based on the total volume of the system (PS+crystallites and PI).

EXAMPLE 9

Preparation of a Three Dimensional Periodic Band Gap Structure Comprising a Double Gyroid This prophetic example shows how one would fabricate a self assembled structure of periodically occurring first and second separate dielectric domains arranged to exhibit three-dimensional periodicity. In the present example, the dielectric domains are present in a polymeric article constructed from a PS/PI/PMMA triblock copolymer and an auxiliary refractive index modifying species residing primarily in one of the domains. The domain characteristic size would be approximately 100 nm for the high and 300 nm for the low dielectric constant domains respectively. The refractive index ratio is estimated to be above 1.1. The fabrication procedure used in this example is a modification of that described in example 7 and is general and can be used to fabricate a large number of potentially useful one, two and three dimensional periodic structures with different length scales and refractive indices. In this prophetic example, we demonstrate how one would use the procedure to fabricate three-dimensional dielectric periodic structures comprising a double gyroid configuration. The characteristic dielectric domain length scale is controlled in this example primarily by the length of the block copolymer and by the volume of added auxiliary species. The length scales and dielectric contrast can be manipulated by means previously described.

The structure according to the current prophetic example is fabricated from an ABC type triblock copolymer with PS comprising block A, PI comprising block B, and polymethyl-methacrylate comprising block C. The fabrication procedure is similar to that outlined in example 7 including the following modifications. The molecular weights of the blocks are about 100 (kilograms/mol) for the PS block (Block A), about 800 (kilograms/mol) for the PI block (Block B), and about 200 (kilograms/mol) for the PMMA block (Block C). These particular molecular weights are chosen to yield a structure comprising a double gyroid with PS and PMMA each forming separate continuous phases within a matrix of PI. These particular molecular weights are chosen to yield a periodic double gyroid structure.

The crystallites in the current example are coated with amine- or thiol-terminated polystyrene and sequester into the PS phase. In addition, the volume of nanocrystallites chosen in this specific example, for double gyroid structure, should be such that the volume fraction of the combined glassy phases (PS+crystallites and the separate PMMA phase) is between approximately 0.32 and 0.37 based on the total volume of the system (PS+crystallites and PMMA and PI).

EXAMPLE 10

Band gap structures Fabricated With Ozonolysis of the PI Phase

Figure 11:
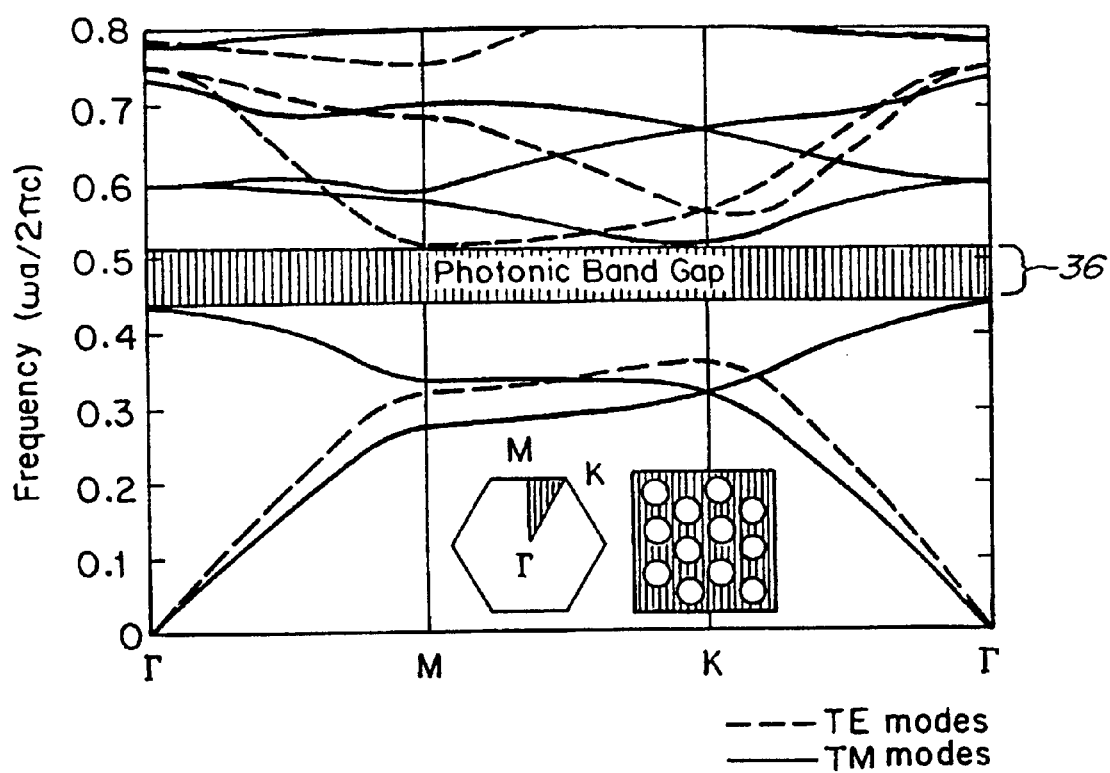
FIG. 11 is a calculated dispersion relation for low dielectric-constant cylinders in a high dielectric matrix showing an omnidirectional photonic band gap.

To any of the above examples an additional step can be added that includes the ozonolysis of the PI phase according to the method described in Hashimoto et al 1997, Langmuir vol 13, pp 6869–6872 incorporated herein by reference. This ozonolysis step enhances the dielectric contrast by selectively removing the PI phase from the structure. Air-filled cylinders arranged on a triangular lattice can be created using a PI/PS/PI triblock copolymer with a total molecular weight of $2 \times 10^6$ Da with volume fractions of 0.125/75/0.125 for the respective components. The triblock copolymer is dissolved in toluene and amine terminated PS coated Indium Phosphide (n=4) crystallites are added to the solution. The volume of the added crystallites should be equal to the volume of the PS. The solution then can be roll cast and annealed under vacuum for 48 hr and subsequently subjected to ozonolysis in order to remove the PI phase. The resultant structure will have a complete band gap 30 as predicted by Joannopolous et al. and as seen in FIG. 11.

EXAMPLE 11

Band Gap Structures Fabricated With Nucleation of Gas Bubbles in One of the Phases To any of the above examples an additional fabrication step can be added in which a low molecular weight component, such as mineral oil with gas dissolved in it, is added to the block polymer mixture. The mineral oil has selective affinity for the PI block and will tend to swell it. By decreasing the pressure in the vessel containing the mixture to about $10^{-3}$ torr in combination with sonification gas bubbles will nucleate in the PI phase thus lowering its effective index of refraction. In all of proceeding examples involving fabrication of photonic band gap articles including an elastic domain, such as a domain comprised of polyisoprene (PI). The elasticity of the PI phase will allow the resulting structure to undergo deformation upon application of stress thus allowing adjustment of the periodic length of the periodic structure and the band gap frequency of the article. The periodic length may be increased in these structures by as much as 1000% due to imposition of physical stress (Honeker et al. "Chemistry of Materials" vol 8 p. 1702 (1996)) enabling formation of band gap articles useful for inhibiting radiation over a very wide range of free space wavelength up to 50 μm.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims, the invention may be practiced otherwise than as specifically described. Also within the scope of the present invention are photonic band gap systems derived from any combinations of the systems previously described.

What is claimed is:

1. A system comprising:
   a polymeric article including a periodic structure of a plurality of periodically occurring separate domains, with at least a first and a second domain formed by self-assembly of polymeric material each domain having a characteristic dimension of from about 15 nm to about 5,000 nm and having a refractive index ratio of at least about 1.1 for a continuous set of wavelengths lying within a range of from about 50 nm to about 50 microns.

2. A system comprising:
   a polymeric article including a periodic structure of a plurality of periodically occurring separate domains, with at least a first and a second domain each comprising a polymeric material and having a characteristic dimension of from about 15 nm to about 5,000 nm and having a refractive index ratio of at least about 1.5 for a continuous set of wavelengths lying within a range of from about 50 nm to about 50 microns.

3. A system comprising:
   a polymeric article including a periodic structure of a plurality of periodically occurring separate domains, with at least a first and a second domain each having a characteristic dimension of from about 15 nm to about 5,000 nm and at least one of the first and second domains containing an auxiliary refractive index modifier providing the first and second domains with a refractive index ratio of at least 1.1 for a continuous set of wavelengths lying within a range of from about 50 nm to about 50 microns.

4. A system as in claim 1, wherein the polymeric article includes a periodic structure of a plurality of periodically occurring separate domains, with at least a first and a second domain each having a characteristic dimension, and wherein at least one of the first and second domains contains an auxiliary refractive index modifier providing the first and second domains with a refractive index ratio of greater than 1.0 for the continuous set of wavelengths.

5. A system as in claim 4, wherein at least one of the first and second domains contains an auxiliary refractive index modifier providing the first and second domains with a refractive index ratio of at least about 1.1 for the continuous set of wavelengths.

6. A system as in claim 5, wherein at least one of the first and second domains contains an auxiliary refractive index modifier providing the first and second domains with a refractive index ratio of at least about 1.2 for the continuous set of wave lengths.

7. A system as in claim 6, wherein at least one of the first and second domains contains an auxiliary refractive index modifier providing the first and second domains with a refractive index ratio of at least about 1.3 for the continuous set of wave lengths.

8. A system as in claim 7, wherein at least one of the first and second domains contains an auxiliary refractive index modifier providing the first and second domains with a refractive index ratio of at least about 1.4 for the continuous set of wave lengths.

9. A system as in claim 1, wherein the article has an at least one-dimensional periodic structure.

10. A system as in claim 1, wherein the article has an at least two-dimensional periodic structure.

11. A system as in claim 1, wherein the polymeric article includes a periodic structure of a plurality of periodically occurring separate domains, with at least a first and a second domain each having a characteristic dimension, wherein the first domain is polymeric and the second domain is a non-polymeric material and the first and second domains are formed by polymeric self-assembly of the first domain and a polymeric precursor of the second domain followed by replacement or conversion of the precursor by the non-polymeric material.

12. A system as in claim 11, wherein said replacement or conversion of the precursor by non-polymeric material comprises chemical modification of the precursor to form the non-polymeric material.

13. A system as in claim 1, wherein the polymeric article includes a periodic structure of a plurality of periodically occurring separate domains, with at least a first and a second domain each having a characteristic dimension, comprising a block copolymer having at least two blocks A and B that are assembled into the first and second domains respectively.

14. A system as claim 13, wherein the block copolymer has at least three blocks A, B, and C.

15. A system as in claim 1, wherein the polymeric article includes a periodic structure of the plurality of periodically occurring separate domains, with at least a first and a second domain each having a characteristic dimension, and wherein at least one of the first and second domains contains an auxiliary refractive index modifier providing the first and second domains with a refractive index ratio of at least about 2.0 for the continuous set of wavelengths.

16. A system as in claim 1, wherein the polymeric article includes a periodic structure of the plurality of periodically occurring separate domains, with at least a first and a second domain each having a characteristic dimension, and wherein at least one of the first and second domains contains an auxiliary refractive index modifier providing the first and second domains with a refractive index ratio of at least about 4.0 for the continuous set of wavelengths.

17. A system as in claim 1, wherein the article has an at least three-dimensional periodic structure.

18. A system as in claim 17, wherein the polymeric article includes at least one defect in periodicity.

19. A system as in claim 1, wherein the polymeric article includes a periodic structure of a plurality of periodically occurring separate domains, with at least a first and a second domain each having a characteristic dimension, wherein the polymeric article has an at least two-dimensional periodic structure and includes at least one defect in the periodic structure in at least one of the at least two dimensions.

20. A system as in claim 19, wherein the defect in periodicity is a series of interconnected points.

21. A system as in claim 19, wherein the defect is a line defect having a width and a length at least 5 times the width.

22. A system as in claim 1, wherein the polymeric article includes a periodic structure of a plurality of periodically occurring separate domains, with at least a first and a second domain each having a characteristic dimension, wherein the polymeric article has an at least three-dimensional periodic structure and includes at least one defect in the periodic structure in at least one of the at least three dimensions.

23. A system as in claim 1, wherein the polymeric article includes at least one defect in periodicity that is continuous pathway having a width and a length at least 10 times the width.

24. A system as in claim 23, wherein the continuous pathway is nonlinear.

25. A system as in claim 24, wherein the continuous is three-dimensionally nonlinear.

26. A system as in claim 1, wherein the polymeric structure includes a plurality of periodically occurring separate domains, with at least a first and second domain each having a characteristic dimension, the article including at least one defect in the order of the dielectric domains of the structure.

27. A system as in claim 1, wherein the polymeric structure includes a plurality of periodically occurring separate domains, with at least a first and a second domain each having a characteristic dimension, the article including at least one defect in refractive index between at least two adjacent domains.

28. A system as in claim 1, wherein the polymeric article includes a periodic structure of a plurality of periodically occurring separate domains with at least a first and a second domain, one of the first or second domains including an auxiliary refractive index-modifying species comprising particulate material.

29. A system as in claim 1, wherein the polymeric article includes a periodic structure of a plurality of periodically occurring separate domains with at least a first and a second domain, one of the first or second domains including an auxiliary refractive index-modifying species comprising a metal-containing, ceramic, or semi-conductor particulate material.

30. A system as in claim 28, wherein the refractive index-modifying species comprises polymeric particles.

31. A system as in claim 28, wherein the refractive index-modifying species comprises dye.

32. A system as in claim 1, wherein the polymeric article comprises a periodically arranged structure of a plurality of separate domains, and wherein the structure inhibits transmittance of electromagnetic radiation at a free space wavelength range of from about 50 nm to about 50 microns relative to transmission of electromagnetic radiation at the wavelength through a system comprised of the same materials but in a disarranged state.

33. A system as in claim 1, wherein the polymeric article comprises a periodically arranged structure of a plurality of separate domains, and wherein the structure inhibits transmittance of electromagnetic radiation at a free space wavelength range of from about 300 nm to about 50 microns relative to transmission of electromagnetic radiation at the wavelength through a system comprised of the same materials but in a disarranged state.

34. A system as in claim 1, wherein the polymeric article comprises a periodically arranged structure of a plurality of separate domains, and wherein the structure has a photonic band gap in at least one direction within a free space wavelength range of from about 50 nm to about 50 microns.

35. A system as in claim 34, wherein the polymeric article comprises a periodically arranged structure of a plurality of separate domains, and wherein the structure has a photonic band gap in at least one direction within a free space wavelength range of from about 300 nm to about 50 microns.

36. A system as in claim 1, wherein the polymeric article is an arranged, periodic structure of a plurality of periodically-occurring separate domains and the article, in a disarranged state, is more transparent to light within a wavelength range of from about 100 to about 10 microns.

37. A system as in claim 36, wherein the article, in a disarranged state, is at least partially transparent to light within a wavelength range of from about 400 nm to about 50 microns.

38. A system as in claim 1, the polymeric article including periodicity in structure of a dimension on the order of from about 100 nm to about 50 microns.

39. A system as in claim 2, wherein the polymeric article includes a periodic structure of a plurality of periodically occurring separate domains, with at least a first and a second domain each having a characteristic dimension, and wherein at least one of the first and second domains with a refractive index ratio of greater than 1.0 for the continuous set of wavelengths.

40. A system as in claim 39, wherein at least one the first and second domains contains an auxiliary refractive index modifier providing the first and second domains with a refractive index ratio of at least about 1.1 for the continuous set of wavelengths.

41. A system as in claim 40, wherein at least one of the first and second domains contains an auxiliary refractive index modifier providing the first and second domains with a refractive index ratio of at least about 1.2 for the continuous set of wavelengths.

42. A system as in claim 41, wherein at least one of the first and second domains contains an auxiliary refractive index modifier providing the first and second domains with a refractive index ratio of at least about 1.3 for the continuous set of wavelengths.

43. A system as in claim 42, wherein at least one of the first and second domains contains an auxiliary refractive index modifier providing the first and second domains with a refractive index ratio of at least about 1.4 for the continuous set of wavelengths.

44. A system as in claim 2, wherein the article has an at least one-dimensional periodic structure.

45. A system as in claim 2, wherein the article has an at least two-dimensional periodic structure.

46. A system as in claim 2, wherein the polymeric article includes a period structure of a plurality of periodically occurring separate domains, with at least a first and a second domain formed by self-assembly of polymeric material.

47. A system as in claim 2, wherein the polymeric article includes a periodic structure of a plurality of periodically occurring separate domains, with at least a first and a second domain each having a characteristic dimension, wherein the first domain is polymeric and the second domain is a non-polymeric material and the first and second domains are formed by polymeric self-assembly of the first domain and a polymeric precursor of the second domain followed by replacement or conversion of the precursor by the non-polymeric material.

48. A system as in claim 47, wherein said replacement or conversion of the precursor by non-polymeric material comprises chemical modification of the precursor to form the non-polymeric material.

49. A system as in claim 2, wherein the polymeric article includes a periodic structure of a plurality of periodically occurring separate domains, with at least a first and a second domain each having a characteristic dimension, comprising a block copolymer having at least two blocks A and B that are assembled into the first and second domains respectively.

50. A system as claim 49, wherein the block copolymer has at least three blocks A, B, and C.

51. A system as in claim 2, wherein the polymeric article includes a periodic structure of the plurality of periodically occurring separate domains, with at least a first and a second domain each having a characteristic dimension, and wherein at least one of the first and second domains contains an auxiliary refractive index modifier providing the first and second domains with a refractive index ratio of at least about 2.0 for the continuous set of wavelengths.

52. A system as in claim 2, wherein the polymeric article includes a periodic structure of the plurality of periodically occurring separate domains, with at least a first and a second domain each having a characteristic dimension, and wherein at least one of the first and second domains contains an auxiliary refractive index modifier providing the first and second domains with a refractive index ratio of at least about 4.0 for the continuous set of wavelengths.

53. A system as in claim 2, wherein the article has an at least three-dimensional periodic structure.

54. A system as in claim 53, wherein the polymeric article includes at least one defect in periodicity.

55. A system as in claim 2, wherein the polymeric article includes a periodic structure of a plurality of periodically occurring separate domains, with at least a first and a second domain each having a characteristic dimension, wherein the polymeric article has an at least two-dimensional periodic structure and includes at least one defect in the periodic structure in at least one of the at least two dimensions.

56. A system as in claim 55, wherein the defect in periodcity is a series of interconnected points.

57. A system as in claim 55, wherein the defect is a line defect having a width and a length at least 5 times the width.

58. A system as in claim 2, wherein the polymeric article includes a periodic structure of a plurality of periodically occurring separate domains, with at least a first and a second domain each having a characteristic dimension, wherein the polymeric article has an at least three-dimensional periodic structure and includes at least one defect in the periodic structure in at least one of the at least three dimensions.

59. A system as in claim 2, wherein the polymeric article includes at least one defect in periodicity that is continuous pathway having a width and a length at least 10 times the width.

60. A system as in claim 59, wherein the continuous pathway is nonlinear.

61. A system as in claim 60, wherein the continuous pathway is three-dimensionally nonlinear.

62. A system as in claim 2, wherein the polymeric structure includes a plurality of periodically occurring separate domains, with at least a first and a second domain each having a characteristic dimension, the article including at least one defect in the order of the dielectric domains of the structure.

63. A system as in claim 2, wherein the polymeric structure includes a plurality of periodically occurring separate domains, with at least a first and a second domain each having a characteristic dimension, the article including at least one defect in refractive index between at least two adjacent domains.

64. A system as in claim 2, wherein the polymeric article includes a periodic structure of a plurality of periodically occurring separate domains with at least a first and a second domain, one of the first or second domains including an auxiliary refractive index-modifying species comprising particulate material.

65. A system as in claim 2, wherein the polymeric article includes a periodic structure of a plurality of periodically occurring separate domains with at least a first and a second domain, one of the first or second domains including an auxiliary refractive index-modifying species comprising a metal-containing, ceramic, or semi-conductor particulate material.

66. A system as in claim 64, wherein the refractive index-modifying species comprises polymeric particles.

67. A system as in claim 64, wherein the refractive index-modifying species comprises dyes.

68. A system as in claim 2, wherein the polymeric article comprises a periodically arranged structure of a plurality of separate domains, and wherein the structure inhibits transmittance of electromagnetic radiation at a free space wavelength range of from about 50 nm to about 50 microns relative to transmission of electromagnetic radiation at the wavelength through a system comprised of the same materials but in a disarranged state.

69. A system as in claim 2, wherein the polymeric article comprises a periodically arranged structure of a plurality of separate domains, and wherein the structure inhibits transmittance of electromagnetic radiation at a free space wavelength range of from about 300 nm to about 50 microns relative to transmission of electromagnetic radiation at the wavelength through a system comprised of the same materials but in a disarranged state.

70. A system as in claim 2, wherein the polymeric article comprises a periodically arranged structure of a plurality of separate domains, and wherein the structure has a photonic band gap in at least one direction within a free space wavelength range of from about 50 nm to about 50 microns.

71. A system as in claim 70, wherein the polymeric article comprises a periodically arranged structure of a plurality of separate domains, and wherein the structure has a photonic band gap in at least one direction within a free space wavelength range of from about 300 nm to about 50 microns.

72. A system as in claim 2, wherein the polymeric article is arranged, periodic structure of a plurality of periodically-occurring separate domains and the article, in a disarranged state, is more transparent to light within a wavelength range of from about 100 nm to about 10 microns.

73. A system as in claim 72, wherein the article, in a disarranged state, is at least partially transparent to light within a wavelength range of from about 400 nm to about 50 microns.

74. A system as in claim 2, the polymeric article including periodicity instructure of a dimension on the order of from about 100 nm to about 50 microns.

75. A system as in claim 3, wherein the article has an at least one-dimensional periodic structure.

76. A system as in claim 3, wherein the article has an at least two-dimensional periodic structure.

77. A system as in claim 3, wherein the polymeric article includes a period structure of a plurality of periodically occurring separate domains, with at least a first and a second domain formed by self-assembly of polymeric material.

78. A system as in claim 3, wherein the polymeric article includes a periodic structure of a plurality of periodically occurring separate domains, with at least a first and a second domain each having a characteristic dimension, wherein the first domain is polymeric and the second domain is a non-polymeric material and the first and second domains are formed by polymeric self-assembly of the first domain and a polymeric precursor of the second domain followed by replacement or conversion of the precursor by the non-polymeric material.

79. A system as in claim 78, wherein said replacement or coversion of the precursor by non-polymeric material comprises chemical modification of the precursor to form the non-polymeric material.

80. A system in claim 3, wherein the polymeric article includes a periodic structure of a plurality of periodically occurring separate domains, with at least a first and a second domain each having a characteristic dimension, comprising a block cpolymer having at least two blocks A and B that are assembled into the first and second domains respectivley.

81. A system as in claim 80, wherein the block copolymer has at least three blocks A, B, and C.

82. A system as in claim 3, wherein the polymeric article includes a periodic structure of the plurality of periodically occurring separate domains, with at least a first and a second domain each having a characteristic dimension, and wherein at least one of the first and second domains contains an auxiliary refractive index modifier providing the first and second domains with a refractive index ratio of at least about 2.0 for the continuous set of wavelengths.

83. A system as in claim 3, wherein the polymeric article includes a periodic structure of the plurality of periodically occurring separate domains, with at least a first and a second domain each having a characteristic dimension, and wherein at least one of the first and second domains contains an auxiliary refractive index modifier providing the first and second domains with a refractive index ratio of at least about 4.0 for the continuous set of wavelengths.

84. A system as in claim 3, wherein the article has an at least three-dimensional periodic structure.

85. A system as in claim 84, wherein the polymeric article includes at least one defect in periodicity.

86. A system as in claim 3, wherein the polymeric article includes a periodic structure of a plurality of periodically occurring separate domains, with at least a first and a second domain each having a characteristic dimension, wherein the polymeric article has an at least two-dimensional periodic structure and includes at least one defect in the periodic structure in at least one of the at least two dimensions.

87. A system as in claim 86, wherein the defect in periodicity is a series of interconnected points.

88. A system as in claim 86, wherein the defect is a line defect having a width and a length at least 5 times the width.

89. A system as in claim 3, wherein the polymeric article includes a periodic structure of a plurality of periodically occurring separate domains, with at least a first and a second domain each having a characteristic dimension, wherein the polymeric article has an at least three-dimensional periodic structure and includes at least one defect in the periodic structure in at least one of the at least three dimensions.

90. A system as in claim 3, wherein the polymeric article includes at least one defect in periodicity that is continuous pathway having a width and a length at least 10 times the width.

91. A system as in claim 90, wherein the continuous pathway is nonlinear.

92. A system as in claim 91, wherein the continuous pathway is three-dimensionally nonlinear.

93. A system as in claim 3, wherein the polymeric structure includes a plurality of periodically occurring separate domains, with at least a first and a second domain each having a characteristic dimension, the article including at least one defect in the order of the dielectric domains of the structure.

94. A system as in claim 3, wherein the polymeric structure includes a plurality of periodically occurring separate domains, with at least a first and a second domain each having a characteristic dimension, the article including at least one defect in refractive index between at least two adjacent domains.

95. A system as in claim 3, wherein the polymeric article includes a periodic structure of a plurality of periodically occurring separate domains with at least a first and a second domain, one of the first or second domains including an auxiliary refractive index-modifying species comprising particulate material.

96. A system as in claim 3, wherein the polymeric article includes a periodic structure of a plurality of periodically occurring separate domains with at least a first and a second domain, one of the first or second domains including an auxiliary refractive index-modifying species comprising a metal-containing, ceramic, or semi-conductor particulate material.

97. A system as in claim 95, wherein the refractive index-modifying species comprises polymeric particles.

98. A system as in claim 95, wherein the refractive index-modifying species comprises dye.

99. A system as in claim 3, wherein the polymeric article comprises a periodically arranged structure of a plurality of separate domains, and wherein the structure inhibits transmittance of electromagnetic radiation at a free space wavelength range of from about 50 nm to about 50 microns relative to transmission of electromagnetic radiation at the wavelength through a system comprised of the same materials but in a disarranged state.

100. A system as in claim 99, wherein the polymeric article comprises a periodically arranged structure of a plurality of separate domains, and wherein the structure inhibits transmittance of electromagnetic radiation at a free space wavelength range of from about 300 nm to about 50 microns relative to transmission of electromagnetic radiation at the wavelength through a system comprised of the same materials but in a disarranged state.

101. A system as in claim 3, wherein the polymeric article comprises a periodically arranged structure of a plurality of separate domains, and wherein the structure has a photonic band gap in at least one direction within a free space wavelength range of from about 50 nm to about 50 microns.

102. A system as in claim 101, wherein the polymeric article comprises a periodically arranged structure of a plurality of separate domains, and wherein the structure has a photonic band gap in at least one direction within a free space wavelength range of from about 300 nm to about 50 microns.

103. A system as in claim 3, wherein the polymeric article is an arranged, periodic structure of a plurality of periodically-occurring separate domains and the article, in a disarranged state, is more transparent to light within a wavelength range of from about 100 nm to about 10 microns.

104. A system as in claim 103, wherein the article, in a disarranged state, is at least partially transparent to light within a wavelength range of from about 400 nm to about 50 microns.

105. A system as in claim 3, the polymeric article including periodicity in structure of a dimension on the order of from about 100 nm to about 50 microns.

* * * * *

UNITED STATES PATENT AND TRADEMARK OFFICE
CERTIFICATE OF CORRECTION

PATENT NO.   : 6,433,931 B1
DATED        : August 13, 2002
INVENTOR(S)  : Yoel Fink et al.

It is certified that error appears in the above-identified patent and that said Letters Patent is hereby corrected as shown below:

Column 4,
Line 5, please correct the misspelling of "emodiment" with -- embodiment --
Line 42, please correct the misspelling of "two-dimentional" with -- two-dimensional --
Line 64, please correct the misspelling of "two-dimentionally" with
-- two-dimensionally --

Column 5,
Line 3, please correct the misspelling of "continous" with -- continuous --
Lines 24-25, please correct the misspelling of "emodiments" with -- embodiments --

Column 6,
Line 25, please correct the misspelling of "auxilliary" with -- auxiliary --

Column 8,
Line 13, please correct the misspelling of "poymeric" with -- polymeric --

Column 9,
Line 12, please correct the misspelling of "hrefractive" with -- refractive --
Line 15, please correct the misspelling of "preferrably" with -- preferably --

Column 19,
Line 41, please correct the misspelling of "partioning" with -- partitioning --

Column 33,
Line 63, please add after "100" -- nm --

Column 34,
Line 8, please add after "second domains" -- contains an auxiliary refractive index modifier providing the first and second domains --

UNITED STATES PATENT AND TRADEMARK OFFICE
CERTIFICATE OF CORRECTION

PATENT NO.    : 6,433,931 B1
DATED         : August 13, 2002
INVENTOR(S)   : Yoel Fink et al.

It is certified that error appears in the above-identified patent and that said Letters Patent is hereby corrected as shown below:

<u>Column 36,</u>
Line 29, please add after "is" -- an --
Line 38, please add a space between "in" and "structure"
Line 66, please correct the misspelling of "cpolymer" to -- copolymer --

Signed and Sealed this

Twenty-third Day of September, 2003

JAMES E. ROGAN
*Director of the United States Patent and Trademark Office*